(12) United States Patent
Römer et al.

(10) Patent No.: US 12,110,970 B2
(45) Date of Patent: Oct. 8, 2024

(54) VALVE FOR TRANSFERRING AT LEAST ONE FLUID

(71) Applicant: Hoffmann-La Roche Inc., Little Falls, NJ (US)

(72) Inventors: Jennifer Römer, Aalen (DE); Christian Neusüss, Aalen (DE)

(73) Assignee: Hoffmann-La Roche Inc., Little Falls, NJ (US)

( * ) Notice: Subject to any disclaimer, the term of this patent is extended or adjusted under 35 U.S.C. 154(b) by 159 days.

(21) Appl. No.: 17/406,782

(22) Filed: Aug. 19, 2021

(65) Prior Publication Data

US 2021/0381608 A1 Dec. 9, 2021

Related U.S. Application Data

(63) Continuation of application No. PCT/EP2020/054474, filed on Feb. 20, 2020.

(30) Foreign Application Priority Data

Feb. 20, 2019 (EP) ..................................... 19158235

(51) Int. Cl.
*F16K 11/074* (2006.01)
*F16K 31/04* (2006.01)
(Continued)

(52) U.S. Cl.
CPC ........ *F16K 11/0743* (2013.01); *F16K 31/041* (2013.01); *G01N 30/20* (2013.01); *G01N 2030/202* (2013.01); *G01N 30/465* (2013.01)

(58) Field of Classification Search
CPC ... F16K 11/0743; F16K 31/041; G01N 30/20; G01N 2030/202; G01N 30/465
See application file for complete search history.

(56) References Cited

U.S. PATENT DOCUMENTS 2,964,061 A * 12/1960 Rawson .............. F16K 11/0743
137/627
3,198,018 A * 8/1965 Broerman .............. G01N 30/24
251/62
(Continued)

FOREIGN PATENT DOCUMENTS

| CN | 107430101 A | 12/2017 |
| WO | WO 2014/015049 A2 | 1/2014 |
| WO | WO 2017/153451 A1 | 9/2017 |

OTHER PUBLICATIONS

International Search Report and Written Opinion of the International Searching Authority, PCT/EP2020/054474, Apr. 22, 2020, 12 pages.
(Continued)

*Primary Examiner* — Craig M Schneider
*Assistant Examiner* — Christopher D Ballman
(74) *Attorney, Agent, or Firm* — Bose McKinney & Evans LLP

(57) ABSTRACT

A fluid transfer valve has ports arranged in groups. The valve has a rotor having channels and an actuator is operably connectable to the rotor. The actuator is positionable in a loading orientation in which the first channel is connected to one or two of the ports to transfer fluid into the first channel and/or the second channel is connected to one or two of the ports to transfer a second fluid into the second channel. The actuator also is positionable into first and second injection orientations in which various ones of the channels and ports are connected for different fluid flow configurations. Each channel has two ends located on a virtual circle whose center coincides with the rotor's axis of rotation. The channels can have a semicircular shape, a semi-oval shape or a U-shape. An analytical system and method that use the inventive valve are also disclosed.

14 Claims, 10 Drawing Sheets

(51) Int. Cl.
*G01N 30/20* (2006.01)
*G01N 30/46* (2006.01)

(56) References Cited

U.S. PATENT DOCUMENTS

| | | | | |
|---|---|---|---|---|
| 3,747,630 | A | * | 7/1973 | Hurrell .................. G01N 30/24 |
| | | | | 137/625.46 |
| 3,868,970 | A | * | 3/1975 | Ayers .................... F16K 11/074 |
| | | | | 137/625.46 |
| 3,975,946 | A | * | 8/1976 | Ball ....................... G01N 30/20 |
| | | | | 137/625.15 |
| 4,444,066 | A | * | 4/1984 | Ogle ..................... G01N 30/20 |
| | | | | 73/864.21 |
| 4,811,611 | A | | 3/1989 | Uffenheimer |
| 5,601,115 | A | * | 2/1997 | Broerman ........... F16K 11/0743 |
| | | | | 137/625.11 |
| 6,012,488 | A | * | 1/2000 | Nichols ............... F16K 11/0743 |
| | | | | 137/625.11 |
| 6,155,123 | A | | 12/2000 | Bakalyar |
| 6,202,698 | B1 | * | 3/2001 | Stearns .................. F16K 11/22 |
| | | | | 137/627.5 |
| 6,315,952 | B1 | | 11/2001 | Sklar et al. |
| 6,453,725 | B1 | * | 9/2002 | Dahlgren ............... G01N 30/20 |
| | | | | 137/869 |
| 6,890,489 | B2 | * | 5/2005 | Nichols .................. H01J 49/04 |
| | | | | 73/864.12 |
| 7,216,528 | B2 | | 5/2007 | Gamache et al. |
| 8,225,817 | B2 | * | 7/2012 | Wilen ................. F16K 11/0743 |
| | | | | 137/625.18 |
| 8,944,102 | B1 | * | 2/2015 | Wiederin ............ F16K 11/0743 |
| | | | | 137/625.46 |
| 9,541,207 | B1 | | 1/2017 | Saetveit et al. |
| 9,683,975 | B2 | * | 6/2017 | Sims ..................... G01N 30/20 |
| 9,739,383 | B2 | * | 8/2017 | Nichols ................. G01N 30/20 |
| 9,945,762 | B2 | * | 4/2018 | Wikfors ................ G01N 30/20 |
| 10,060,541 | B1 | * | 8/2018 | Saetveit ............... F16K 11/0853 |
| 10,487,954 | B2 | * | 11/2019 | Killip ..................... G01N 30/20 |
| 10,746,708 | B2 | * | 8/2020 | Olovsson ............... G01N 30/20 |
| 2006/0042686 | A1 | | 3/2006 | Gamache et al. |
| 2006/0185419 | A1 | | 8/2006 | Gamache et al. |
| 2012/0119127 | A1 | * | 5/2012 | Tower ...................... F16K 3/08 |
| | | | | 251/304 |
| 2013/0206240 | A1 | | 8/2013 | Gerhardt et al. |
| 2014/0373605 | A1 | | 12/2014 | Nichols et al. |
| 2015/0047730 | A1 | * | 2/2015 | Dourdeville ........... G01N 30/20 |
| | | | | 137/625.47 |
| 2015/0090345 | A1 | * | 4/2015 | Olovsson ............. F16K 11/0743 |
| | | | | 137/15.06 |
| 2015/0226712 | A1 | * | 8/2015 | Jencks ................. F16K 11/0743 |
| | | | | 137/1 |
| 2015/0247827 | A1 | * | 9/2015 | Nichols ................ G01N 30/463 |
| | | | | 73/863.83 |
| 2016/0139094 | A1 | * | 5/2016 | Hartmann ........... F16K 99/0013 |
| | | | | 137/625.46 |
| 2018/0088091 | A1 | | 3/2018 | Cormier et al. |
| 2018/0161697 | A1 | | 6/2018 | Liu et al. |
| 2018/0224006 | A1 | | 8/2018 | Killip |

OTHER PUBLICATIONS

Schlecht et al., Two-dimensional capillary electrophoresis-mass spectrometry (CE-CE-MS): coupling MS-interfering capillary electromigration methods with mass spectrometry, Analytical and Bioanalytical Chemistry (2018) 410, pp. 6353-6359.

Jooß et al., Two-dimensional capillary zone electrophoresis-mass spectrometry for the characterization of intact monoclonal antibody charge variants, including deamidation products, Anal Bioanal Chem (2017) 409, pp. 6057-6067.

Sánchez-Hernández et al., In-capillary approach to eliminate SDS interferences in antibody analysis by capillary electrophoresis coupled to mass spectrometry, Electrophoresis (2017) 38, pp. 1044-1052.

* cited by examiner

VALVE FOR TRANSFERRING AT LEAST ONE FLUID

RELATED APPLICATIONS

This application is a continuation of PCT/EP2020/054474, filed Feb. 20, 2020, which claims priority to EP 19 158 235.2, filed Feb. 20, 2019, the entire disclosures of which are hereby incorporated herein by reference.

BACKGROUND

This disclosure relates to a valve for transferring at least one fluid, an analytical system for analyzing a sample, a method for transferring at least one fluid and a use of a valve. The devices and methods according to this disclosure may specifically be used for multi-dimensional separation of samples and the chemical characterization of molecules. Specifically, the devices and methods according to this disclosure may be applied in the field of bioanalytics, particularly in the field of protein analysis. Other applications are feasible.

Several electromigrative separation techniques are used in the field of bioanalytics, particularly in the fields of proteomics and metabolomics. A lot of these techniques are even more commonly applied in the pharmaceutical and bio-pharmaceutical industry, particularly for analysis of proteins, specifically for analysis of antibodies, charge variants or other proteoforms. Specifically, mass spectrometry techniques have been applied as important techniques for identifying molecules, including large biomolecules like proteins. A combination of electromigrative separation techniques with mass spectrometry techniques may be challenging, specifically as chemicals such as surfactants which are commonly applied within the electromigrative separation techniques may lead to disturbing effects during conducting a measurement with the mass spectrometry technique. A separation of these chemicals from a sample may generally be realized via additional separation dimensions.

In WO 2017153451 A1, a sample transfer device, an analytical system for analyzing a sample, a method for sample transfer and a method for manufacturing the sample transfer device are disclosed. The sample transfer device comprises: •at least one first block and at least one second block, wherein the first block comprises at least one first port and at least one second port, wherein the second block comprises at least one third port and at least one fourth port; •at least one slider, wherein the slider is located between the first block and the second block, wherein the slider is configured to slide from a first position to a second position and vice versa; wherein both in the first position and in the second position a first straight channel is formed between the first port and the third port and a second straight channel is formed between the second port and the fourth port.

The publication Schlecht J. et al., Analytical and Bioanalytical Chemistry (2018) 410: 6353-6359 describes advantages, limitations, and applications of two dimensional capillary electrophoresis-mass spectrometry (CE-CE-MS) systems. Further, an outlook towards future developments is given.

In Jooß K. et al., Anal Bioanal Chem (2017) 409: 6057-6067 a heart-cut CZE-CZE-MS setup with an implemented mechanical four-port valve interface is described that used a generic ε-aminocaproic acid based background electrolyte in the first dimension and acetic acid in the second dimension. Interference-free, highly precise mass data (deviation less than 1 Da) of charge variants of trastuzumab, acting as model mAb system, were achieved. The mass accuracy obtained (lowparts per million range) is discussed regarding both measured and calculated masses. Deamidation was detected for the intact model antibody, and related mass differences were significantly confirmed on the deglycosylated level. The CZE-CZE-MS setup is expected to be applicable to a variety of antibodies and electrolyte systems. Thus, it has the potential to become a compelling tool for MS characterization of antibody variants separated in ESI-interfering electrolytes.

In Sánchez-Hernandez L. et al., Electrophoresis 2017, 38, 1044-1052, a CE-MS method for the analysis of mAbs is presented analyzing SDS-complexed samples. To obtain narrow and intensive peaks of SDS-treated antibodies, an in-capillary strategy was developed based on the co-injection of positively charged surfactants and methanol as organic solvent. For samples containing 0.2% (v/v) of SDS, recovered MS peak intensities up to 97 and 95% were achieved using cetyltrimethylammonium bromide or benzalkonium chloride, respectively. Successful removal of SDS was shown in neutral coated capillaries but also in a capillary with a positively charged coating applying reversed polarity. The usefulness of this in-capillary strategy was demonstrated also for other proteins and for antibodies dissolved in up to 10% v/v SDS solution, and in other SDS-containing matrices, including the sieving matrix used in a standard CE-SDS method and gel-buffers applied in SDS-PAGE methods. The developed CE-MS approaches enable fast and reproducible characterization of SDS-complexed antibodies.

Despite the advantages and progress achieved by the above-mentioned developments, some significant technical challenges remain. Thus, generally, known techniques for sample transfer generally imply the challenge of tightness such that leakage may occur. Further, known systems and devices often are mechanically unstable, which generally may lead to material abrasion and/or voltage drop. Further, an exact transfer of the sample from a first dimension to a second dimension while maintaining a high separation efficiency of electromigrative separation techniques is often challenging, specifically as small dimensions of utilized capillaries and/or a need of a high electrical isolation are generally required.

SUMMARY

This disclosure teaches a valve, an analytical system for analyzing a sample, a method for transferring at least one fluid and a use of a valve which at least partially avoid the shortcomings of known devices and methods of this kind and which at least partially address the above-mentioned challenges. Specifically, devices and methods are disclosed which allow for a precise and reliable transfer of well-defined sample volumes, specifically of small sample volumes such as of small sample volumes in the nanoliter range, and which are usable specifically in electromigrative sample separation techniques.

As used in the following, the terms "have," "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B," "A comprises B" and "A includes B" may both refer to a situation in which, besides B, no other element is present in A (i.e., a situation in which A solely and exclusively consists of B) and to a situation in which, besides B, one or more further elements are present in entity A, such as element C, elements C and D or even further elements.

Further, it shall be noted that the terms "at least one," "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once. It shall also be understood for purposes of this disclosure and appended claims that, regardless of whether the phrases "one or more" or "at least one" precede an element or feature appearing in this disclosure or claims, such element or feature shall not receive a singular interpretation unless it is made explicit herein. By way of non-limiting example, the terms "stator," "rotor," "actuator," and "channel," to name just a few, should be interpreted wherever they appear in this disclosure and claims to mean "at least one" or "one or more" regardless of whether they are introduced with the expressions "at least one" or "one or more." All other terms used herein should be similarly interpreted unless it is made explicit that a singular interpretation is intended.

Further, as used in the following, the terms "preferably," "more preferably," "particularly," "more particularly," "specifically," "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

The term "fluid" as used herein is a broad term and is to be given its ordinary and customary meaning to a person of ordinary skill in the art and is not to be limited to a special or customized meaning. The term specifically may refer, without limitation, to an arbitrary substance such as a liquid or gas or a mixture thereof, that is capable of flowing and that changes its shape at a steady rate when acted upon by a force tending to change its shape. The terms "first fluid" and "second fluid" may be considered as nomenclature only, without numbering or ranking the named channels, without specifying an order and without excluding a possibility that several kinds of first fluids and second fluids may be present. Further, other kinds of fluids such as one or more third fluids or fourth fluids may be present.

As further used herein the term "sample" may refer to an arbitrary material or combination of materials taken for an analysis, testing or investigation. The sample may be a limited quantity of something which is intended to be similar to and represent a larger amount. However, the sample may also comprise a full specimen. The sample may be solid sample, a liquid sample or a gaseous sample or a combination of these. Specifically, the sample may be a fluid sample, i.e., a sample which fully or partially is in a liquid state and/or in a gaseous state. A quantity of the sample may be describable in terms of its volume, mass or size. However, other dimensions are feasible. The sample may comprise only one material or only one compound. Alternatively, the sample may comprise several materials or compounds.

The term "analyte" generally refers to an arbitrary element, component or compound which may be present in the sample and the presence and/or the concentration of which may be of interest. As an example, the at least one analyte may be selected from the group consisting of proteins; peptides; metabolites, environmental pollutants, organic acids, particularly amino acids; pharmaceuticals; biomarkers, particularly cancer biomarkers; antibodies; impurities of pharmaceutical products, particularly of bio pharmaceutical products; variants of pharmaceutical products, particularly of bio pharmaceutical products. Additionally or alternatively, however, other types of analytes may be used and/or any combination of analytes may be determined.

In a first aspect of this disclosure, a valve for transferring at least one fluid is disclosed. The term "valve" as used herein is a broad term and is to be given its ordinary and customary meaning to a person of ordinary skill in the art and is not to be limited to a special or customized meaning. The term specifically may refer, without limitation, to an arbitrary device that regulates, directs or controls a flow of a fluid such as by opening, closing, or partially obstructing various passageways. Thus, the valve may be configured to transfer or to transmit the fluid partially or completely from a first dimension or first location into at least one further dimension or further location such as into a second dimension or second location. However, further dimensions like third dimensions are also feasible. Thus, the valve may also be referred to as a fluid transfer device or as a sample transfer device.

The "dimension" may be or may comprise an arbitrary volume configured to receive the fluid at least partially such as a vessel or a channel. Still, other embodiments are feasible. The first dimension and the further dimension may be separate dimensions such that the fluid or parts of the fluid may only be transferred from the first dimension to the further dimension or vice versa by an intervening barrier or space. The valve may be configured to transfer parts of the fluid or to transfer specific components of the fluid which may be of interest for a user such as one or more of the analytes of the fluid.

The valve comprises at least one stator. The stator comprises a plurality of ports. The ports comprise a plurality of groups of ports. The plurality of groups of ports comprise a first group of at least two first ports, a second group of at least two second ports and a third group of at least two third ports. Further, the valve comprises at least one rotor. The rotor comprises a plurality of channels. The channels comprise at least one first channel and at least one second channel. Further, the valve comprises at least one actuator. The actuator is operably connectable to the rotor. The actuator is configured to rotate the rotor into at least one loading orientation. In the loading orientation one or both of the following situations are present:
  a) the first channel is connected to the first ports such that a first fluid is transferable via at least one of the first ports into the first channel;
  b) the second channel is connected to the second ports such that a second fluid is transferable via at least one of the second ports into the second channel.

The actuator is further configured to rotate the rotor into at least one first injection orientation and into at least one second injection orientation. In the first injection orientation the first channel is connected to the third ports and the first fluid is transferable from the first channel into at least one of the third ports. In the second injection orientation the second channel is connected to the third ports and the second fluid is transferable from the second channel into at least one of the third ports. Optionally, in situation a), the first fluid may also be transferable back into one of the first ports. In situation b), optionally, the second fluid may also be transferable back into one of the second ports.

The term "stator" as used herein is a broad term and is to be given its ordinary and customary meaning to a person of ordinary skill in the art and is not to be limited to a special or customized meaning. The term specifically may refer, without limitation, to an arbitrary component of a machine that remains at least essentially fixed with respect to rotating parts of the machine. The stator may have a cylindrical shape. However, other shapes may be possible as well. The stator may be attachable to the actuator via screws and the rotor, which will further be described below in more detail, may be located between the stator and the actuator.

As outlined above, the stator comprises a plurality of ports. The term "port" as used herein is a broad term and is to be given its ordinary and customary meaning to a person of ordinary skill in the art and is not to be limited to a special or customized meaning. The term specifically may refer, without limitation, to an arbitrary unit which may be configured to connect two or more elements to each other such that a fluid medium or a solid medium may be transferable from one element to another element. Specifically, a port may be a part of a channel having at least one opening which allows for fluid entering the channel or leaving the channel and/or which allows for connecting a fluid connection to the channel. Exemplarily, the ports may be connectable to a device and/or to a vessel via capillaries. Still, other embodiments are feasible. The port may specifically be a tight port configured to prevent a leakage of the fluid at least to a large extent. Therefore, the port may have a low dead volume. The capillaries may specifically be connected by gluing, bonding or welding or by using assemblies of port fittings and screwable fittings. The term "plurality of ports" refers to a presence of more than one port. Specifically, the stator may comprise a total number of six ports. More specifically, the stator may comprise a total number of eight ports. However, also a smaller or a higher number of ports may be feasible.

The term "first ports" and "second ports" may be considered as nomenclature only, without numbering or ranking the named elements, without specifying an order and without excluding a possibility that several kinds of first ports and second ports may be present. Further, additional ports such as one or more third ports may be present, such as will further be described below in more detail.

The term "group of ports" may refer to two or more ports which share at least one common feature. Specifically, the ports of one single group of ports may be connected, specifically fluidically connected, to one single external, additional device such as an analytical device, sample separation device or fluid support such as a syringe. Thus, one port of the group of ports may act as an inlet and the other port of the same group of ports may act as an outlet. The inlet may be configured to supply the fluid such as a sample to a channel of the rotor and the outlet may be configured to lead the fluid away from the channel. Thus, the ports of one single group of ports may be configured to establish a fluid circuit between the external, additional device and one of the channels of the rotor. The channels will further be described below in more detail.

The terms "first group" and "second group" may be considered as nomenclature only, without numbering or ranking the named groups, without specifying an order and without excluding a possibility that several kinds of first groups and second groups may be present. Further, additional groups such as one or more third groups may be present. Specifically, the plurality of ports may further comprise at least one fourth group of at least two fourth ports. Further, the channels may comprise at least one fourth channel.

The term "rotor" as used herein is a broad term and is to be given its ordinary and customary meaning to a person of ordinary skill in the art and is not to be limited to a special or customized meaning. The term specifically may refer, without limitation, to an arbitrary rotating component of a machine. The rotor may be rotatable around an axis of the rotor. By rotating, the rotor may change its orientation. The rotation may be caused by an interaction between windings and magnetic fields which produces a torque around the axis of the rotor. Thus, the term "rotating" may refer to a turning of the rotor around an axis of center point of the rotor. Further, the term "rotating" may refer to a changing of an orientation of the rotor.

The rotor may have a cylindrical ground shape. Specifically, the rotor may have a cylindrical ground shape with a small thickness. The rotor may have a thickness of at least 1.5 mm, preferably of at least 2 mm, more preferably of at least 2.5 mm, most preferably of at least 3 mm. However, also other dimensions may be feasible.

The rotor may comprise at least one polymer material; a ceramic material; a glass; at least one non-electric conductive material.

Specifically, the channels are formed as grooves, e.g., as receptacles or indentations, in surfaces of the rotor. Thus, the channels may be "open channels". As further used herein, the term "open channel" may generally refer to a slot or a trench cut into a surface of a solid material, specifically into a smooth surface of the solid material. The open channels may be through such that the open channel may pass all the way through the surface of the solid material and such that ends of the open channel may be accessible. Alternatively, the open channel may be stopped such that one or both of the ends may finish before the open channel meets an edge of the surface.

The grooves may be at least partially covered by at least one cover element or cover. The term "cover element" (also referred to as a "cover") may generally refer to an arbitrary element which has a surface configured to be attachable to a further surface of a further element. Thus, a shape of the surface of the cover element and a shape of the further surface of the further element may be complementary to each other. Exemplarily, the surface of the cover element and the further surface of the further element may be flat surfaces such that a tight connection between the surface and the further surface may be formable. The cover element may specifically be made of an optically transparent material such as glass. However, other materials are also feasible.

The term "channel" as used herein is a broad term and is to be given its ordinary and customary meaning to a person of ordinary skill in the art and is not to be limited to a special or customized meaning. The term specifically may refer, without limitation, to an arbitrary element which may have an elongate shape and which may provide a free volume or lumen and which enables a flow of a fluid medium there through. Consequently, the channel may be configured to receive a solid or fluid medium and/or to provide a transfer of the medium from one end of the channel to the other end of the channel. The channel may preferably be a tight channel such that a leakage of the medium may be prevented at least to a large extent.

The term "first channel" and "second channel" may be considered as nomenclature only, without numbering or ranking the named channels, without specifying an order and without excluding a possibility that several kinds of first channels and second channels may be present. Further, additional channels may be present. Specifically, the channels may further comprise at least one third channel. In the loading orientation, which will further be described below in more detail, the third channel may be connected to the third ports.

The term "plurality of channels" refers to a presence of more than one channel. Specifically, the rotor may comprise a total number of two or three channels. More specifically, the rotor may comprise a total number of four channels. However, a smaller or a higher number of channels may also be feasible.

The channels each may be designed such that when a channel is connected to a respective group of ports the channel and the group of ports may form a loop. Thus, the fluid may be transferable from at least one port of the group of ports into the channel and from the channel back into at least one further port of the group of ports. Thus, as described above, one port of the group of ports may act as an inlet and the other port of the same group of ports may act as an outlet. The inlet may be configured to supply the fluid such as a sample to a channel of the rotor and the outlet may be configured to lead the fluid away from the channel. The channels each may comprise a first end and a second end. In the loading orientation or in one of the injection orientations, the one port of a group of ports may be located, e.g., fluidically connected, at the first end of one channel and the other port of the same group of ports may be located at the second end of the same channel.

The channels may specifically be configured to connect one group of ports with each other. Thus, the first channel may be configured to connect the two first ports with each other in the loading orientation and to connect the two third ports with each other in the first injection orientation. Further, the second channel may be configured to connect the two second ports with each other in the loading orientation and to connect the two third ports with each other in the second injection orientation.

The channels may be at least partially located on a virtual circle. The virtual circle may be located on at least one surface of the rotor. As used herein, the term "virtual circle" generally refers to line defined by its distance from a center point. Apart from this property, the circle does not necessarily have to be distinguished from residual surfaces of the rotor structurally. Specifically, a center point of the virtual circle may correspond to an axis of rotation of the rotor. The channels may respectively have two ends. The ends may respectively be located on the virtual circle. Specifically, the channels may respectively correspond to a circle section of the virtual circle. Specifically, the channels may respectively have a shape selected from the group consisting of: a straight shape, a semicircular shape, a semi-oval shape, a U-shape. However, other shapes may be feasible as well. Thereby, the channels may have a shape selected from the group consisting of: a straight shape, a semicircular shape, a semi-oval shape, a U-shape.

The first channel may have a first distance to the axis of rotation of the rotor and the second channel may have a second distance to the axis of rotation. The third channel may have a third distance to the axis of rotation. Further, the rotor may have a fourth channel, which will further be described below in more detail. The fourth channel may have a fourth distance to the axis of rotation. The first distance and the second distance may be essentially equal. Further, the first distance, the second distance and the third distance may be essentially equal. Further, the first distance, the second distance, the third distance and the fourth distance may be essentially equal. The term "essentially equal" may refer to the possibility that sight variations between the different distances may exist. Thus, one of the distances may show a deviation of a maximum of 10% from one of the other distances, preferably a deviation of a maximum of 5% from one of the other distances, more preferably a deviation of a maximum of 2% from one of the other distances.

As outlined above, the first channel at least one first channel end and the second channel may comprise at least one second channel end. The first channel end and the second channel end face may each other. A distance between the first channel end and the second channel end may at least 1 mm, preferably of at least 2 mm, more preferably of at least 3 mm. Due to a high distance between the channels and thus of the ports a higher separation voltage can be applied. Now at least 25 kV can be applied. By applying known valves, only a maximum of 15 kV could be achieved without a spark over between the ports. That principally speeds up a total analysis. A higher thickness of the rotor in comparison to rotors of known valves may also contribute to the possibility of applying higher voltages.

At least one of the channels may have a volume of 1 nl to 500 nl, preferably of 5 nl to 100 nl, preferably of 10 nl to 40 nl, most preferably of 20 nl. Specifically, the first channel may have a first volume, the second channel may have a second volume. Further, the third channel may have a third volume. Further, the fourth channel may have a fourth volume. The first volume and the second volume may be equivalent. Specifically, the first volume, the second volume and one or both of the third volume and the fourth volume may be equivalent. The term "equivalent" may include slight variations between the different volumes. Thus, one of the volumes may show a deviation of a maximum of 10% from one of the other volumes, preferably a deviation of a maximum of 5% from one of the other volumes, more preferably a deviation of a maximum of 2% from one of the other volumes. Alternatively, the first volume and the second volume may be different from each other. Specifically, the first volume and the second volume and one or both of the third volume and the fourth volume may be different from each other.

The channels may be microfluidic channels. As further used herein, the term "microfluidic channels" may refer to dimensions of the channel at a small, typically sub-millimeter scale. The channels may be microfabricated. Exemplarily, the channels may at least partially have a round cross-section, an oval cross-section or a trapezoidal cross-section with a diameter of 5 µm to 500 µm, preferably of 20 µm to 100 µm. Further, the channels may at least partially have a rectangular cross-section with a width of 20 µm to 500 µm, preferably of 50 µm to 200 µm and more preferably of 100 µm, and with a depth of 5 µm to 100 µm, preferably of 10 µm to 50 µm and more preferably of 30 µm. Still, other embodiments are feasible. Further, one or more of the channels may have a length of 0.5 mm to 5 mm, preferably of 0.8 mm to 2 mm, more preferably of 0.9 mm to 1 mm, most preferably of 0.95 mm.

The term "actuator" as used herein is a broad term and is to be given its ordinary and customary meaning to a person of ordinary skill in the art and is not to be limited to a special or customized meaning. The term specifically may refer, without limitation, to an arbitrary element which is configured to move or control a mechanism or a system. The actuator may be operated by a source of energy, typically electric current or mechanical pressure and may convert energy into motion. The actuator may be selected from the group consisting of: a mechanical actuator, an electromagnetic actuator, a pneumatic actuator, a hydraulic actuator. However, other kinds of actuators may be applied. The term "operably connectable" as further used herein, may refer to a property of the actuator and the rotor of being connectable in such a manner such that the rotor fulfills its function, e.g., rotates, by being operated or triggered by the actuator. Thus, there may be an electrical connection between the actuator and the rotor. The actuator may be configured to rotate the rotor from the loading orientation into the first injection orientation and from the first injection orientation into the second injection orientation and vice versa. Further, the actuator may be configured to rotate the rotor into a third injection orientation, specifically from the second injection orientation.

The term "orientation" as used herein is a broad term and is to be given its ordinary and customary meaning to a person of ordinary skill in the art and is not to be limited to a special or customized meaning. The term specifically may refer, without limitation, to an arrangement of a point of an element relative to an axis of the element which is positioned transverse to an axis of rotation of the element. While a distance between the point and the axis of rotation of the element may stay identical during a change in the orientation, e.g., by rotating the element, an angle of the point relative to the axis may vary during the change in the orientation. Thus, the rotor may take different orientations such as the loading orientation, the first injection orientation and the second injection orientation by being rotated around the axis of the rotor.

The term "loading orientation" as used herein is a broad term and is to be given its ordinary and customary meaning to a person of ordinary skill in the art and is not to be limited to a special or customized meaning. The term specifically may refer, without limitation, to an arbitrary orientation of the rotor, wherein one or more of the channels, specifically one or more of the first channel, the second channel and the fourth channel, are filled with a fluid. Specifically, the first channel may be filled with the first fluid and the second channel may be filled with the second fluid. Further, the fourth channel may be filled with the fourth fluid. As described above, the actuator is configured to rotate the rotor into the least one loading orientation. Thus, specifically, the actuator may be configured to rotate the rotor into one single loading orientation. In the single loading orientation, the first channel may be connected to the first ports such that the first fluid is transferable via at least one of the first ports into the first channel and, at the same time, the second channel may be connected to the second ports such that the second fluid is transferable via at least one of the second ports into the second channel. Further, at the same time, the fourth channel may be connected to the fourth ports such that the fourth fluid is transferable via at least one of the fourth ports into the fourth channel. Thus, a loading of the first channel and of the second channel and, optionally, also of the fourth channel, may take place simultaneously, e.g., at the same time. Additionally or alternatively, however, the actuator may be configured to rotate the rotor into a plurality of loading orientations. Thus, exemplarily, in a first loading orientation, the first channel may be connected to the first ports such that the first fluid is transferable via at least one of the first ports into the first channel. Further, in a second loading orientation, which is different from the first loading orientation, the second channel may be connected to the second ports such that the second fluid is transferable via at least one of the second ports into the second channel. Further, in a fourth loading orientation, which is different from the first loading orientation and from the second loading orientation, the fourth channel may be connected to the fourth ports such that the fourth fluid is transferable via at least one of the fourth ports into the fourth channel. Thus, a loading of the first channel and of the second channel and, optionally, also of the fourth channel, may take place one after the other, e.g., successively.

The terms "a fluid is transferable" may generally refer to an active or passive transportation of an arbitrary fluid from one location to another location or vice versa. Thereby, the term "active transportation" generally means that the transportation is supported by external forces and/or actuation means such as pumps or valves used for a directed transportation of the material. Thus, the term "active transportation" may also refer to a defined manipulation of the fluid. The term "passive transportation" may refer to transportation without external actuation and exemplarily include transportation by capillary forces.

The term "a channel is connected to the ports" may generally refer to an arrangement of one of the channels to a group of ports such that a transfer of a fluid from one of the group of ports to the other one of group of ports via the channel or vice versa is provided.

The term "injection orientation" as used herein is a broad term and is to be given its ordinary and customary meaning to a person of ordinary skill in the art and is not to be limited to a special or customized meaning. The term specifically may refer, without limitation, to an arbitrary orientation of the rotor, wherein one of the channels, may be connected to the third ports and a fluid may be transferred from the channel into one of the third ports. The terms "first injection orientation" and "second injection orientation" may be considered as nomenclature only, without numbering or ranking the named injection orientations, without specifying an order and without excluding a possibility that several kinds of first injection orientations and second injection orientations may be present. Further, additional injection orientations such as one or more third injection orientations may be present. The actuator may be configured to rotate the rotor into a plurality of injection orientations. Thus, exemplarily, in the first injection orientation, the first channel may be connected to the third ports such that the first fluid is transferable from the first channel into one of the third ports. Further, in the second injection orientation, the second channel may be connected to the third ports such that the second fluid is transferable from the second channel into one of the third ports. Further, in the third injection orientation, the fourth channel may be connected to the third ports such that the fourth fluid is transferable from the fourth channel into one of the third ports. Thus, an injection of fluids into one of the third ports may take place one after the other, e.g., successively.

As described above, the plurality of ports may further comprise the at least one fourth group of at least two fourth ports. Further, the channels may comprise the at least one fourth channel. In the loading orientation the following situation may be present:

c) the fourth channel is connected to the fourth ports such that a fourth fluid is transferable into the fourth channel.

Optionally, in situation c), the fourth fluid may be transferable back into the fourth ports. Further, the actuator may be configured to rotate the rotor into at least one third injection orientation. In the third injection orientation the fourth fluid may be transferable from the fourth channel into at least one of the third ports.

One or more of the groups of ports may respectively be connectable to at least one pump for providing fluid, specifically to at least one syringe pump or any other liquid delivering system. Specifically, the second ports and/or the fourth ports may be respectively connectable to the one pump for providing fluid, specifically the syringe pump. The second channel and the fourth channel may be positioned on opposing sides of the rotor with respect to an axis of rotation of the rotor. However, also other configurations may be feasible.

Thus, the channels that may be used for CE(SDS) and CZE-MS may be positioned on the opposite sides. Therefore, the ports may be more independent in comparison to ports of known valves. Thus, a small leakage of fluids such as SDS between the stator and rotor only may have a limited effect on a CZE-MS separation. A higher stability of the analysis is therefore feasible.

The rotor further may comprise at least one cavity configured to receive excessive fluid. The term "cavity" may generally refer to an arbitrary void volume within a surface of a solid material, such as the surface of the rotor. The cavity may have dimensions in the sub-millimeter range and may thus be micro-fabricated. Further, the cavity may have at least one cross-section selected from the group consisting of: a round cross-section, an oval cross-section, a polygonal cross-section, particularly a rectangular cross-section. Specifically, the cavity may be embodied as a channel.

In a further aspect of this disclosure an analytical system for analyzing a sample is disclosed.

As further used herein, the term "system" refers to a group of at least two elements which may interact with each other in order to fulfill at least one common function. The at least two components may be handled independently or may be coupled, connectable or integratable in order to form a common component. Thus, an "analytical system" generally refers to a group of at least two elements or components which are capable of interacting in order to perform at least one sample transfer and/or at least one analytical detection, specifically at least one analytical detection of the analyte of the sample. The analytical system may generally also be referred to as an analytical kit, a sensor system or a measurement system.

The analytical system comprises the valve as described above or as will further be described below. It shall be noted, however, that other embodiments are feasible. Further, the analytical system further comprises at least one analytical device fluidically connectable to the two third ports.

The term "analytical device" generally refers to an arbitrary device configured for conducting at least one analytical measurement. The analytical device may preferably be an electronic device, which may be handled independently from the sample transfer device. The analytical device may be adapted to interact with the sample transfer device in order to derive at least one item of information of the analyte of the sample. Specifically, the analytical device may be adapted to detect at least one signal produced by the analyte as will further be described below in more detail. Thus, the analytical device may comprise at least one electronic evaluation device in order to derive the at least one item of information of the analyte from the at least one signal. Thus, the analytical device may comprise at least one evaluation unit comprising at least one data processing device, such as a microcontroller.

Further, the analytical system may comprise at least one sample separation device fluidically connectable to the first ports. The term "separation" may generally refer to an arbitrary process of eliminating specific components of a material or sample or may as well refer to an arbitrary process of removing at least one part of the material or the sample from an original residence. Thus, the removed part of the material or the sample and the residual part of the material or the sample may have a different chemical composition, respectively. The sample separation device may be selected from the group consisting of: an electromigrative device, specifically a capillary zone electrophoresis (CZE), specifically a capillary sieving electrophoresis (CSE), specifically a capillary sieving electrophoresis (CSE) of proteins complexed with tensides such as sodium dodecyl sulfate, specifically a capillary isoelectric focusing (CIEF), specifically an imaging CIEF (iCIEF); a chromatographic device, specifically a liquid chromatography device (LC), specifically a size exclusion chromatography (SEC) device, specifically an ion chromatography (IC) device, preferably a capillary electrophoresis device, and reversed phase liquid chromatography and hydrophilic liquid interaction chromatography (HILIC).

The analytical device may be selected from the group consisting of: a mass spectrometer coupled on-line to liquid phase separations device, preferably atmospheric pressure ionization (API)—MS, more preferably an electrospray ionization, an atmospheric pressure chemical ionization or an atmospheric pressure photoionization mass spectrometer. The analytical system may further comprise at least one characterization unit. The characterization unit may be located between the sample separation device and the one of the first ports. Further, the characterization unit may be configured for characterization of at least one property of the first fluid. Specifically, the characterization unit may be an optical or conductivity detection unit.

In a further aspect of this disclosure, a method for transferring at least one fluid is disclosed. The term "transferring at least one fluid" as used herein is a broad term and is to be given its ordinary and customary meaning to a person of ordinary skill in the art and is not to be limited to a special or customized meaning. The term specifically may refer, without limitation, to an arbitrary process of transporting a fluid from one location to another location or vice versa, such as by active or passive transportation as described above.

The method for transferring at least one fluid comprises the method steps as given in the independent claims and as listed as follows. The method steps may be performed in the given order. However, other orders of the method steps are feasible. Further, one or more of the method steps may be performed in parallel and/or on a timely overlapping fashion. Further, one or more of the method steps may be performed repeatedly. Further, additional method steps may be present which are not listed.

The method uses the valve as described above or as will further be described below. It shall be noted, however, that other embodiments are feasible. The method comprises the following steps:

I. conducting one or both of the following steps while the rotor is in the loading orientation:
  I.1 feeding the first fluid into the first channel while the first channel is connected to the first ports;
  I.2 feeding the second fluid into the second channel while the second channel is connected to the second ports;
II. transferring the first fluid to one of the third ports by rotating the rotor into the first injection orientation, specifically from the loading orientation;

III. transferring the second fluid to one of the third ports by rotating the rotor into the second injection orientation, specifically from the first injection orientation.

As further used herein, the term "feed" as used herein is a broad term and is to be given its ordinary and customary meaning to a person of ordinary skill in the art and is not to be limited to a special or customized meaning. The term specifically may refer, without limitation, to an arbitrary process of adding or loading an arbitrary free volume with a material or a sample. Therefore, the free volume may be fluidically connected to the material or the sample. Thereby, the material or the sample may be transferred to the free volume by active or by passive transportation as described above or as will further be described below.

Specifically, the plurality of groups of ports may comprise a fourth group of at least two fourth ports. The channels further may comprise at least one fourth channel, and the method may further comprises the following steps:

I.3 feeding a fourth fluid into the fourth channel while the rotor is in the loading orientation and while the fourth channel is connected to the fourth ports;

IV. transferring the fourth fluid to one of the third ports by rotating the rotor into a third injection orientation, specifically from the second injection orientation.

In a further aspect of this disclosure, a use of a valve as described above or as will further be described below for at least one purpose selected from the group consisting of: mass spectroscopy detection of protein analysis and proteomics like protein charge variants or of proteoforms and of metabolite analysis and metabolomics; connection of electro driven separation techniques and chromatographic separation to a mass spectrometer is described.

The proposed sample transfer device, the proposed analytical system for analyzing a sample, the proposed method for sample transfer and the proposed method for manufacturing the sample transfer device provide many advantages over know devices and methods.

For the purpose of realizing a decomplexing strategy, commonly, a peak of interest from a CE(SDS) dimension in between a methanol and a cationic surfactant in a CZE-MS dimension has to be transferred. A simultaneous positioning in both dimensions commonly needs to be assured for the successful decomplexing of SDS-protein complexes. A right positioning is commonly a crucial factor for a successful analysis and this is commonly challenging due to imprecise detection of the positioning.

Due to a high creeping tendency of SDS between the stator and the rotor, leakage can commonly be caused when the valve is not tight or after some time of use. Even small leakage may connect the actual independent CE(SDS) and CZE-MS dimensions, thus current instability and a total breakdown of the analysis can be the result. Therefore, a bigger distance between the separation dimensions would be beneficial to keep the loops independent and stable during analysis. In common valves, the channels each may have different volumes. Thus, before starting the conditioning for a second analysis, the previous analysis commonly has to be completed and the valve has to be switched back.

With the new valve, it may be possible to position decomplexing plugs such as methanol and/or cationic surfactants more precisely and to apply a higher separation voltage. Due to the new geometry, also a higher robustness against SDS leakage is possible and a simultaneous conditioning of the CE(SDS) dimension may save additional time. Therefore, the CE(SDS)-CZE-MS analysis with the new valve may be speeded up, more reproducible and more robust. By combining CE(SDS) through a valve with an online SDS-protein decomplexing strategy, it may be feasible to get online mass information from CE(SDS) separated peaks.

The valve may have six ports, specifically eight ports. The channels, specifically the loops, may be arranged further away from each other in comparison to channels of known valves. While known valves commonly have channels with a distance of 0.85 mm, the channels of the valve according to this disclosure may have a distance of 3.14 mm from each other, the channels of the known valves may have a distance of 0.85 of each other. The channels of the valve according to this disclosure may have a volume 40 nl, the channels of the known valves may have a volume of 4 nl to 20 nl. The channels may now have all the same volume. Thus, there may be a 4-fold symmetry. Due to the 4-fold geometry, the CE(SDS) dimension can be prepared for the next analysis (conditioned) meanwhile the separation takes place in the CZE-MS dimension. This is a high time saving factor as conditioning takes about 1 h and the analysis in CZE(MS) about 30 min. Thus, there may be a time saving of 30 min.

Further, the rotor may be thicker than before (before: 1 mm; now: 3 mm). Now, there may be different loop volumes available such as 10 nl, 20 nl or 40 nl. The valve may now have a universal actuator. Thus, the rotor can be switched to every programmed orientation in both directions. The rotors may specifically be available in different polymer materials.

Methanol and the cationic surfactant plugs may now have their own ports and can be positioned more precisely by turning a filled channel to the third ports, specifically to a CZE-MS dimension and transferring a defined volume, specifically by applying pressure. Other channels and ports may be used for an CE(SDS) and for an CZE-MS analysis. Here, a higher reproducibility of a plug positioning and a decomplexing may be feasible. This may lead to a higher success rate for an analysis.

With the new valve, it may be possible to get mass spectra from proteins separated via CE(SDS). The positioning of the peak of interest in the CE(SDS) and the positioning of methanol and the cationic surfactant may be done simultaneously. The velocity of the CE(SDS) peak may be determined by an external UV-detector. To the contrary, by utilizing known valves a velocity of the methanol and cationic surfactants may be determined by an external $C_4D$ detector. Additionally, the presented valve can be used for multiple heart cut analysis when CE(SDS) is not the first separation dimension.

The rotor of the valve according to this disclosure may have a larger number of channels in comparison to known rotors of valves. The channel may be applied for transferring solvents. However, the channels may also be applied for transferring samples. Specifically, a plurality of fractions may be applied.

Summarizing and without excluding further possible embodiments, the following embodiments may be envisaged:

Embodiment 1: A valve for transferring at least one fluid comprising:
  at least one stator, wherein the stator comprises a plurality of ports, the ports comprising a plurality of groups of ports, the plurality of groups of ports comprising a first group of at least two first ports, a second group of at least two second ports and a third group of at least two third ports;
  at least one rotor, wherein the rotor comprises a plurality of channels, the channels comprising at least one first channel and at least one second channel; and at least one actuator, wherein the actuator is operably connectable to the rotor;

wherein the actuator is configured to rotate the rotor into at least one loading orientation, wherein in the loading orientation one or both of the following situations are present:
- a) the first channel is connected to the first ports such that a first fluid is transferable via at least one of the first ports into the first channel;
- b) the second channel is connected to the second ports such that a second fluid is transferable via at least one of the second ports into the second channel;

wherein the actuator is further configured to rotate the rotor into at least one first injection orientation and into at least one second injection orientation, wherein in the first injection orientation the first channel is connected to the third ports and the first fluid is transferable from the first channel into at least one of the third ports, wherein in the second injection orientation the second channel is connected to the third ports and the second fluid is transferable from the second channel into at least one of the third ports.

Embodiment 2: The valve according to the preceding embodiment, wherein the channels each are designed such that when a channel is connected to a respective group of ports the channel and the group of ports form a loop, wherein fluid is transferable from at least one port of the group of ports into the channel and from the channel back into at least one further port of the group of ports.

Embodiment 3: The valve according to any one of the preceding embodiments, wherein the plurality of ports further comprises at least one fourth group of at least two fourth ports, wherein the channels further comprise at least one fourth channel.

Embodiment 4: The valve according to the preceding embodiment, wherein in the loading orientation the following situation is present:
- c) the fourth channel is connected to the fourth ports such that a fourth fluid is transferable into the fourth channel.

Embodiment 5: The valve according to any one of the two preceding embodiments, wherein the actuator is further configured to rotate the rotor into at least one third injection orientation, wherein in the third injection orientation the fourth fluid is transferable from the fourth channel into at least one of the third ports.

Embodiment 6: The valve according to any one of the three preceding embodiments, wherein the second ports and the fourth ports are respectively connectable to at least one pump for providing fluid, specifically to at least one syringe pump or any other liquid delivering system.

Embodiment 7: The valve according to the preceding embodiment, wherein the second channel and the fourth channel are positioned on opposing sides of the rotor with respect to an axis of rotation of the rotor.

Embodiment 8: The valve according to any one of the preceding embodiments, wherein the channels further comprise at least one third channel, wherein in the loading orientation the third channel is connected to the third ports.

Embodiment 9: The valve according to any one of the preceding embodiments, wherein the channels are at least partially located on a virtual circle, wherein the center point of the virtual circle corresponds to an axis of rotation of the rotor, wherein the channels respectively have two ends.

Embodiment 10: The valve according to the preceding embodiment, wherein the ends are respectively located on the virtual circle.

Embodiment 11: The valve according to the preceding embodiment, wherein the channels respectively correspond to a circle section of the virtual circle.

Embodiment 12: The valve according to any one of the two preceding embodiments, wherein the channels respectively have a shape selected from the group consisting of: a straight shape, a semicircular shape, a semi-oval shape, a U-shape.

Embodiment 13: The valve according to any one of the preceding embodiments, wherein at least one of the channels has a volume of 1 nl to 500 nl, preferably of 5 nl to 100 nl, preferably of 10 nl to 40 nl, most preferably of 20 nl.

Embodiment 14: The valve according to any one of the preceding embodiments, wherein the first channel has a first volume, wherein the second channel has a second volume, wherein the first volume and the second volume are equivalent or wherein the first volume and the second volume are different from each other.

Embodiment 15: The valve according to any one of the preceding embodiments, wherein the channels are microfluidic channels.

Embodiment 16: The valve according to any one of the preceding embodiments, wherein one or more of the channels have a length of 0.5 mm to 5 mm, preferably of 0.8 mm to 2 mm, more preferably of 0.9 mm to 1 mm, most preferably of 0.95 mm.

Embodiment 17: The valve according to any one of the preceding embodiments, wherein one or more of the channels have an essentially straight shape.

Embodiment 18: The valve according to any one of the preceding embodiments, wherein the first channel has a first distance to an axis of rotation of the rotor, wherein the second channel has a second distance to the axis of rotation, wherein the first distance and the second distance are essentially equal.

Embodiment 19: The valve according to any one of the preceding embodiments, wherein the first channel comprises at least one first channel end, wherein the second channel comprises at least one second channel end, wherein the first channel end and the second channel end face each other, wherein a distance between the first channel end and the second channel end is at least 1 mm, preferably of at least 2 mm, more preferably of at least 3 mm.

Embodiment 20: The valve according to any one of the preceding embodiments, wherein the rotor has a thickness of at least 1.5 mm, preferably of at least 2 mm, more preferably of at least 2.5 mm, most preferably of at least 3 mm.

Embodiment 21: The valve according to any one of the preceding embodiments, wherein the channels are formed as grooves in surfaces of the rotor.

Embodiment 22: The valve according to the preceding embodiment, wherein the grooves are at least partially covered by at least one cover element.

Embodiment 23: The valve according to any one of the preceding embodiments, wherein the rotor comprises at least one polymer material; a ceramic material; a glass; at least one non-electric conductive material.

Embodiment 24: The valve according to any one of the preceding embodiments, wherein the actuator is configured to rotate the rotor from the loading orientation into the first injection orientation and from the first injection orientation into the second injection orientation and vice versa.

Embodiment 25: The valve according to any one of the preceding embodiments, wherein the actuator is selected from the group consisting of: a motor, specifically an electric motor; a mechanical actuator; an electromagnetic actuator; a pneumatic actuator; a hydraulic actuator.

Embodiment 26: An analytical system for analyzing a sample, wherein the analytical system comprises the valve according to any one of the preceding embodiments, wherein the analytical system further comprises at least one analytical device fluidically connectable to the two third ports.

Embodiment 27: The analytical system according to any one of the two preceding embodiments, wherein the analytical system comprises further comprises at least one sample separation device fluidically connectable to the first ports.

Embodiment 28: The analytical system according to the preceding embodiment, wherein the sample separation device is selected from the group consisting of: an electromigrative device, specifically a capillary zone electrophoresis (CZE), specifically a capillary sieving electrophoresis (CSE), specifically a capillary sieving electrophoresis (CSE) of proteins complexed with tensides such as sodium dodecyl sulfate, specifically a capillary isoelectric focusing (CIEF), specifically an imaging CIEF (iCIEF)); a chromatographic device, specifically a liquid chromatography device (LC), specifically a size exclusion chromatography (SEC) device, specifically an ion chromatography (IC) device, preferably a capillary electrophoresis device, and reversed phase liquid chromatography and hydrophilic liquid interaction chromatography (HILIC).

Embodiment 29: The analytical system according to the three preceding embodiments, wherein the analytical device is selected from the group consisting of: a mass spectrometer coupled on-line to liquid phase separations device, preferably atmospheric pressure ionization (API)—MS, more preferably an electrospray ionization, an atmospheric pressure chemical ionization or an atmospheric pressure photoionization mass spectrometer.

Embodiment 30: The analytical system according to any one of the four preceding embodiments, wherein the analytical system further comprises at least one characterization unit, wherein the characterization unit is located between the sample separation device and the one of the first ports, wherein the characterization unit is configured to characterization of at least one property of the first fluid.

Embodiment 31: The analytical system according to the preceding embodiment, wherein the characterization unit is an optical or conductivity detection unit.

Embodiment 32: A method for transferring at least one fluid, the method using the valve according to any one of the preceding embodiments referring to a valve, the method comprising the following steps:
I. conducting one or both of the following steps while the rotor is in the loading orientation:
  I.1 feeding the first fluid into the first channel while the first channel is connected to the first ports;
  I.2 feeding the second fluid into the second channel while the second channel is connected to the second ports;
II. transferring the first fluid to one of the third ports by rotating the rotor into the first injection orientation, specifically from the loading orientation;
III. transferring the second fluid to one of the third ports by rotating the rotor into the second injection orientation, specifically from the first injection orientation.

Embodiment 33: The method according to the preceding embodiment, wherein the ports further comprise at least two fourth ports, wherein the channels further comprise at least one fourth channel, wherein the method further comprises the following steps:

I.3 feeding a fourth fluid into the fourth channel while the rotor is in the loading orientation and while the fourth channel is connected to the fourth ports;
IV. transferring the fourth fluid to one of the third ports by rotating the rotor into a third injection orientation, specifically from the second injection orientation.

Embodiment 34: A use of a valve according to any one of the preceding embodiments referring to a valve for at least one purpose selected from the group consisting of: mass spectroscopy detection of protein analysis and proteomics like protein charge variants or of proteoforms and of metabolite analysis and metabolomics; connection of electro driven separation techniques and chromatographic separation to a mass spectrometer.

BRIEF DESCRIPTION OF THE DRAWINGS

The above-mentioned aspects of exemplary embodiments will become more apparent and will be better understood by reference to the following description of the embodiments taken in conjunction with the accompanying drawings, wherein.

DESCRIPTION

The embodiments described below are not intended to be exhaustive or to limit the invention to the precise forms disclosed in the following detailed description. Rather, the embodiments are chosen and described so that others skilled in the art may appreciate and understand the principles and practices of this disclosure.

Figure 1:
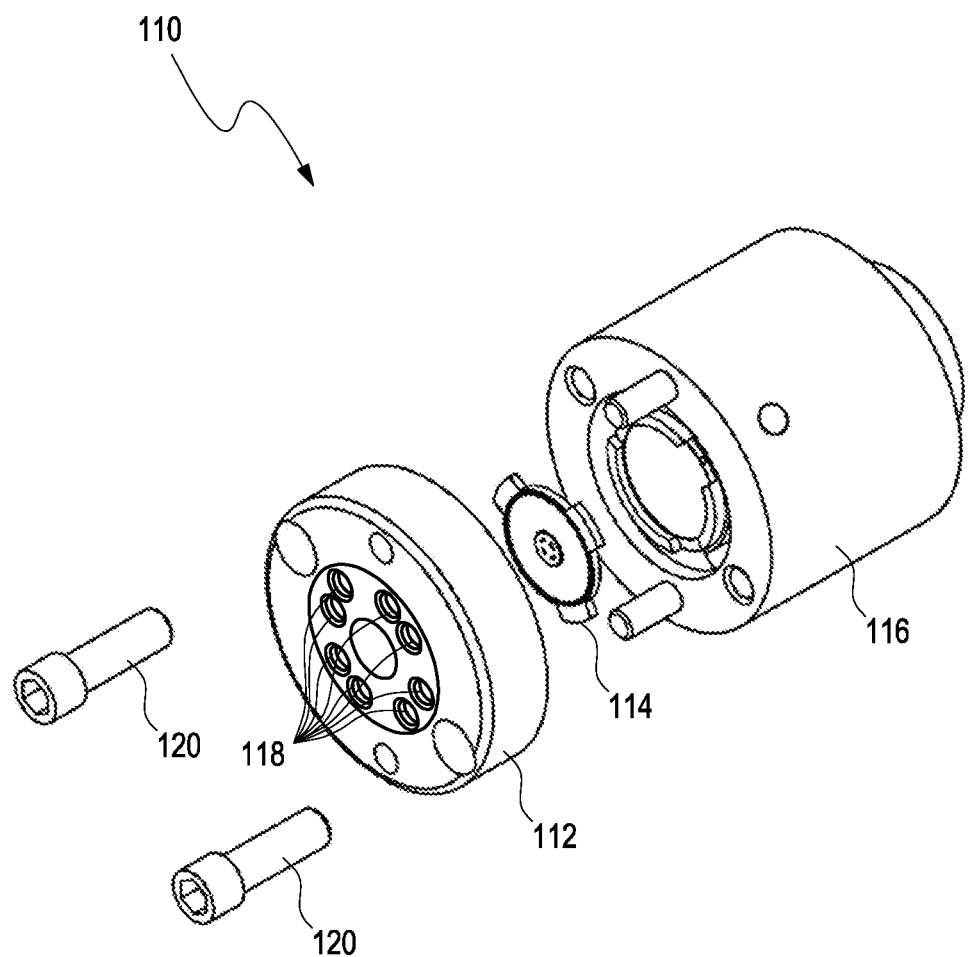
FIG. 1 shows an exemplary embodiment of a valve according to this disclosure in a disassembled view.

FIG. 1 shows an exemplary embodiment of a valve 110 in a disassembled (exploded) view. The valve 110 comprises a stator 112, a rotor 114 and an actuator 116. The stator 112 comprises a plurality of ports 118. The stator 112 may have a cylindrical shape. The actuator 116 is operably connectable to the rotor 114 and the stator 112 may be attachable to the actuator 116 via screws 120. More details on the components of the valve may be provided in the subsequent figures.

Figure 2:
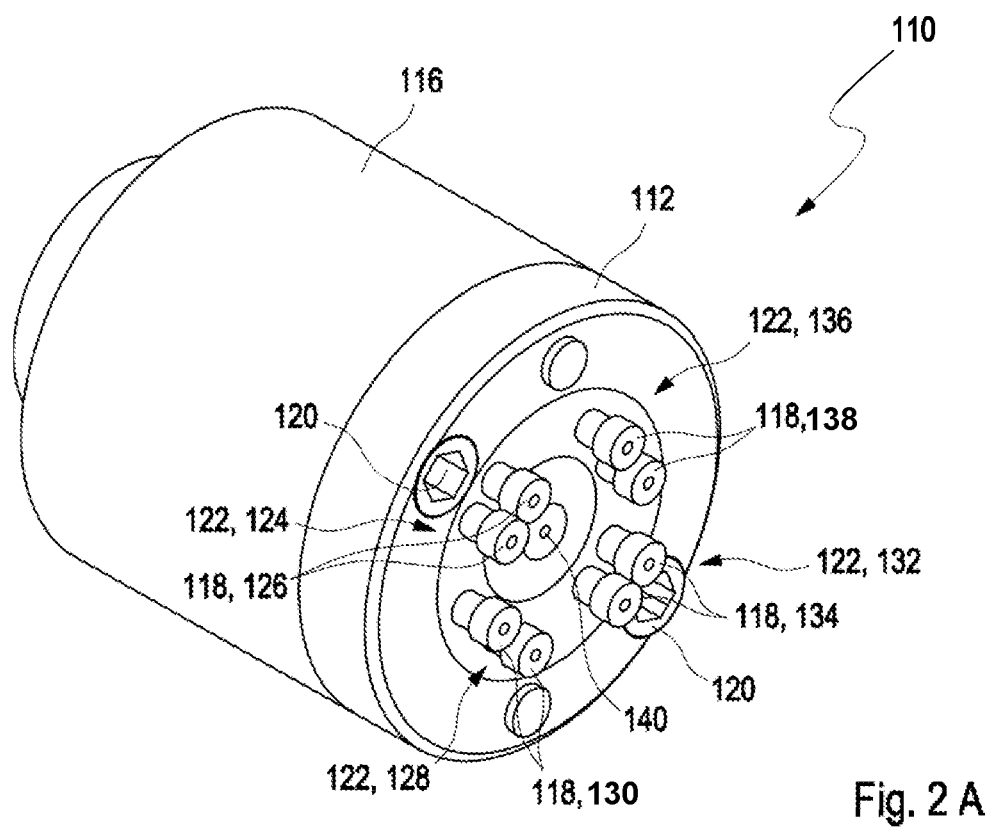
FIGS. 2A to 2B show an exemplary embodiment of a valve according to this disclosure in a perspective view (FIG. 2A) and in a top view (FIG. 2B)
Figure 2:
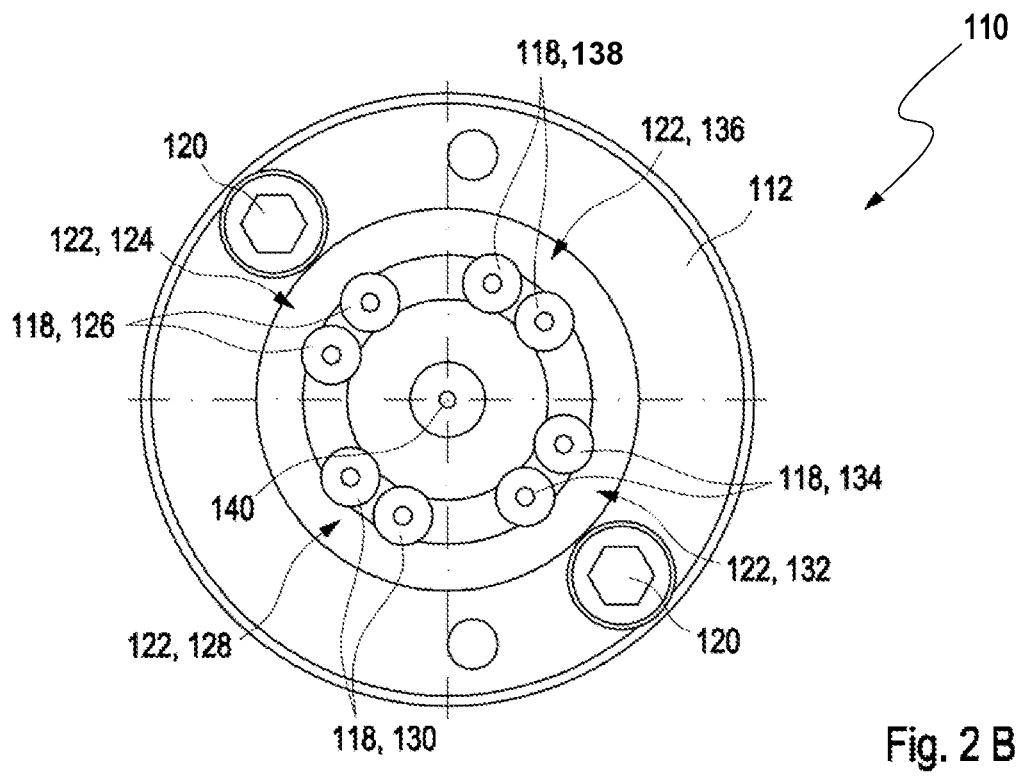

FIGS. 2A and 2B show an exemplary embodiment of a valve 110 according to this disclosure in a perspective view (FIG. 2A) and in a top view (FIG. 2B). The valve 110 according to FIGS. 2A and 2B at least partially corresponds to the valve 110 according to FIG. 1. Thus, reference may be made to the description of FIG. 1 above.

The valve 110 according to FIG. 2A comprises a plurality of ports 118. The plurality of ports 118 comprise a plurality of groups 122 of ports 118. The groups 122 of ports 118 comprise a first group 124 of at least two first ports 126, a second group 128 of at least two second ports 130, a third group 132 of at least two third ports 134. Further, the groups 122 of ports 118 may comprise a fourth group 136 of at least two fourth ports 138. Further, the stator 112 may comprise a leak hole 140.

The ports 118 may be fluidically connectable to channels of the rotor 114. Further details on the rotor 114 will be given below.

Figure 3:
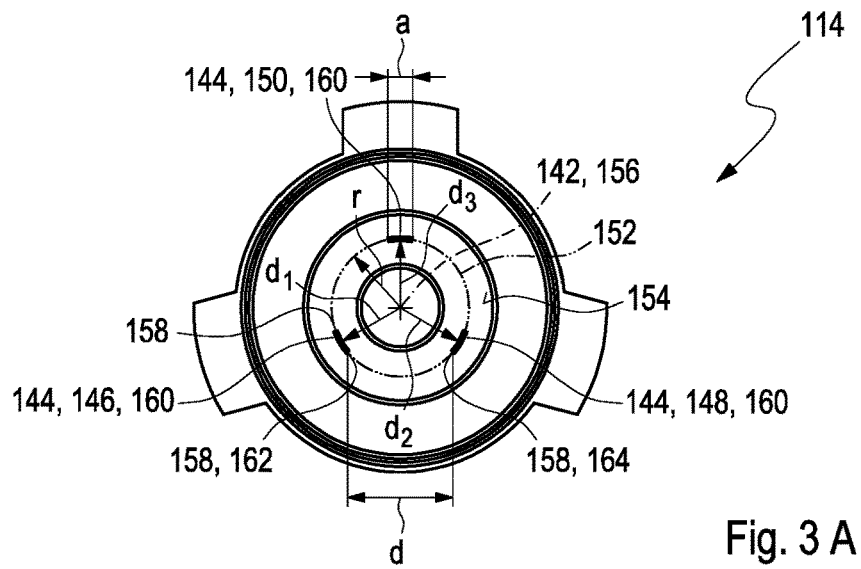
FIGS. 3A to 3C show exemplary embodiments of a rotor of a valve according to this disclosure.
Figure 3:
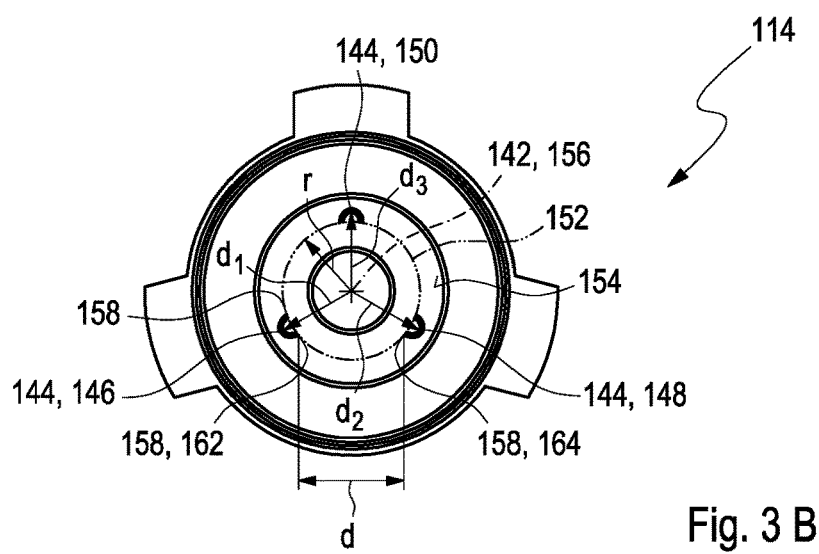
Figure 3:
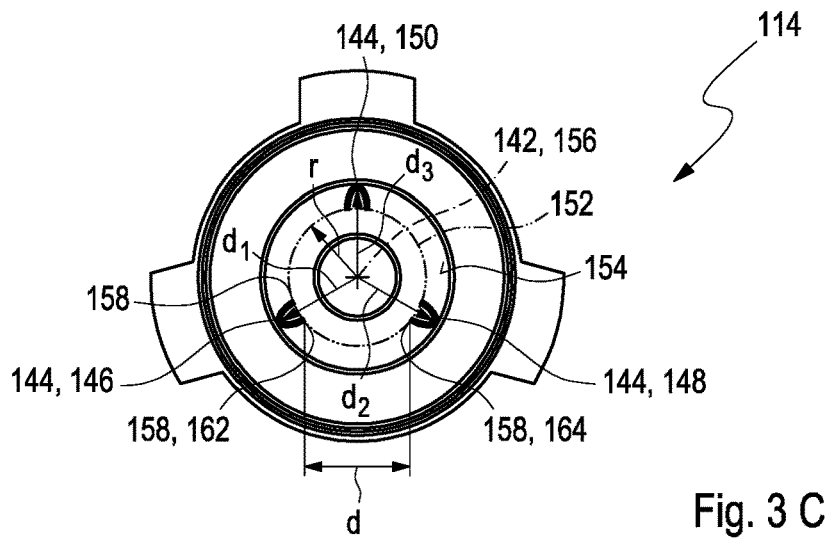

FIGS. 3A to 3C show exemplary embodiments of a rotor 114 of a valve 110 according to this disclosure. The valve 110 may correspond at least partially to the valve according to FIG. 1 or to the valve 110 according to FIGS. 2A and 2B. Thus, reference may be made to the description of FIG. 1 and of FIGS. 2A and 2B above.

The rotors 114 as illustrated in FIGS. 3A to 3C may be rotatable around an axis 142 of the rotor 114. Further, the rotors 114 as illustrated in FIGS. 3A to 3C may be made of least one polymer material; a ceramic material; a glass; at least one non-electric conductive material. Further, the rotors 114 as illustrated in FIGS. 3A to 3C may have a cylindrical ground shape.

The rotors 114 as illustrated in FIGS. 3A to 3C comprise a plurality of channels 144. The plurality of channels comprise at least one first channel 146 and at least one second channel 148. Further, the plurality of channels may comprise at least one third channel 150.

The channels 144 of the rotors 114 as illustrated in FIGS. 3A to 3C may be at least partially located on a virtual circle 152. The virtual circle 152 may be located on at least one surface 154 of the rotor 114. Specifically, a center point 156 of the virtual circle 152 may correspond to the axis 142 of rotation of the rotor 114. The channels 144 may respectively have two ends 158. The ends 158 of the channels 144 according to FIGS. 3A to 3C may respectively be located on the virtual circle 152.

The first channel 146 may have a first distance $d_1$ to the axis 142 of rotation of the rotor 114, the second channel 148 may have a second distance $d_2$ to the axis 142 of rotation. The third channel 150 may have a third distance $d_3$ to the axis 142 of rotation. The first distance $d_1$, the second distance $d_2$ and the third distance $d_3$ may be essentially equal.

The first channel 146 may comprise at least one first channel end 162 and the second channel 148 may comprise at least one second channel end 164. The first channel end 162 and the second channel end 164 may face may each other. A distance d may be 4.33 mm.

Specifically, the channels 144 of the rotor 114 according to FIG. 3A may respectively correspond to a circle section 160 of the virtual circle 152. The channels 144 of the rotor 114 according to FIG. 3A may have a length a of 0.95 mm. Further, the channels 144 of the rotor 114 according to FIG. 3A may each have a volume of 10 nl. However, other volumes may be feasible as well. Thus, the channels 144 of the rotor 114 according to FIG. 3A may also have a volume of 20 nl or 40 nl.

Specifically, the channels 144 of the rotor 114 according to FIG. 3B may respectively have a semicircular shape. Further, the channels 144 of the rotor 114 according to FIG. 3B may each have a volume of 20 nl. However, other volumes may be feasible as well. Thus, the channels 144 of the rotor 114 according to FIG. 3B may also have a volume of 10 nl or 40 nl.

Specifically, the channels 144 of the rotor 114 according to FIG. 3C may respectively have a semi-oval shape. Further, the channels 144 of the rotor 114 according to FIG. 3C may each have a volume of 40 nl. However, other volumes may be feasible as well. Thus, the channels 144 of the rotor 114 according to FIG. 3C may also have a volume of 20 nl or 10 nl.

FIGS. 4A to 4D show exemplary embodiments of a rotor 114 of a valve 110 according to this disclosure. The rotors 114 may correspond at least partially to the rotors 114 according to FIGS. 3A to 3C. Thus, reference may be made to the description of FIGS. 3A to 3B above.

In contrast to the rotors 114 according to FIGS. 3A to 3C the rotors 114 according to FIGS. 4A to 4D further comprise a fourth channel 166. The fourth channel 166 may have a fourth distance $d_4$ to the axis 142 of rotation. The first distance $d_1$, the second distance $d_2$, the third distance $d_3$ and the fourth distance $d_4$ may be essentially equal.

Figure 4:
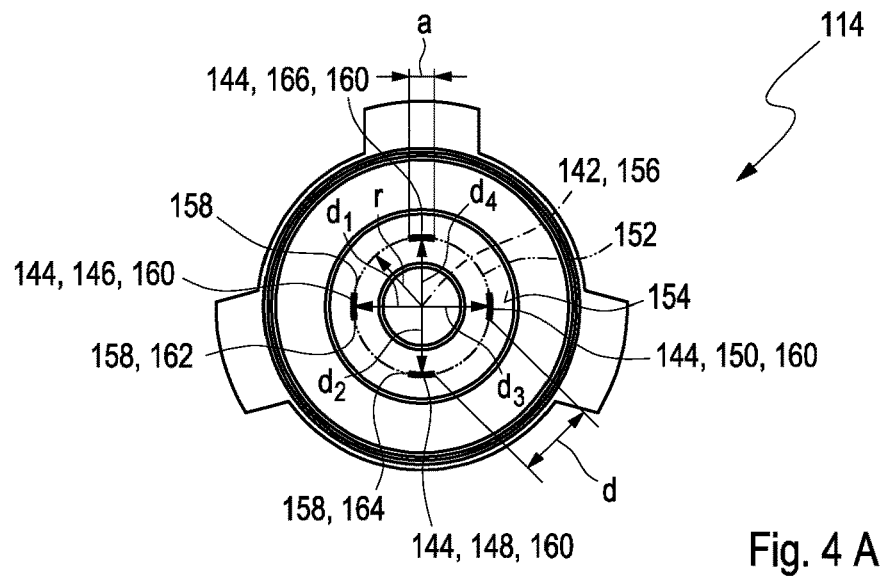
FIGS. 4A to 4D show further exemplary embodiments of a rotor of a valve according to this disclosure.
Figure 4:
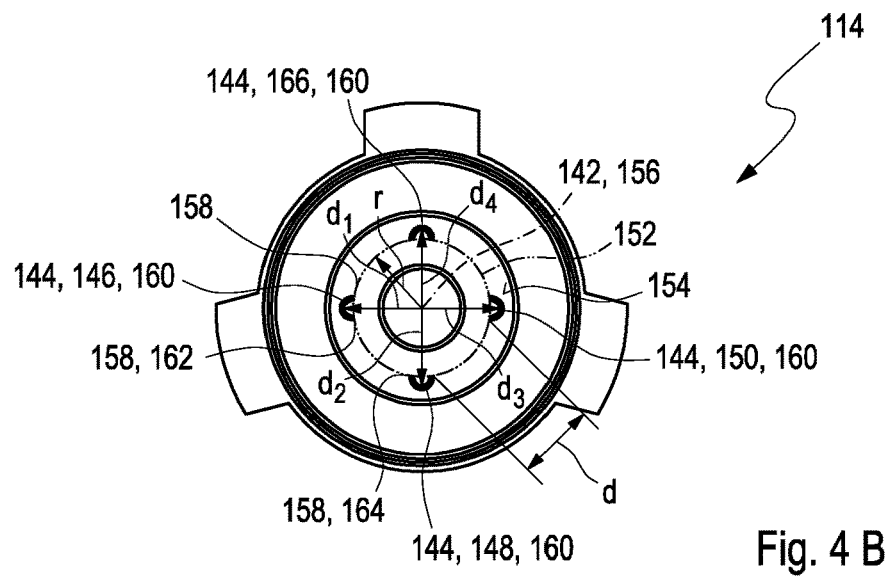
Figure 4:
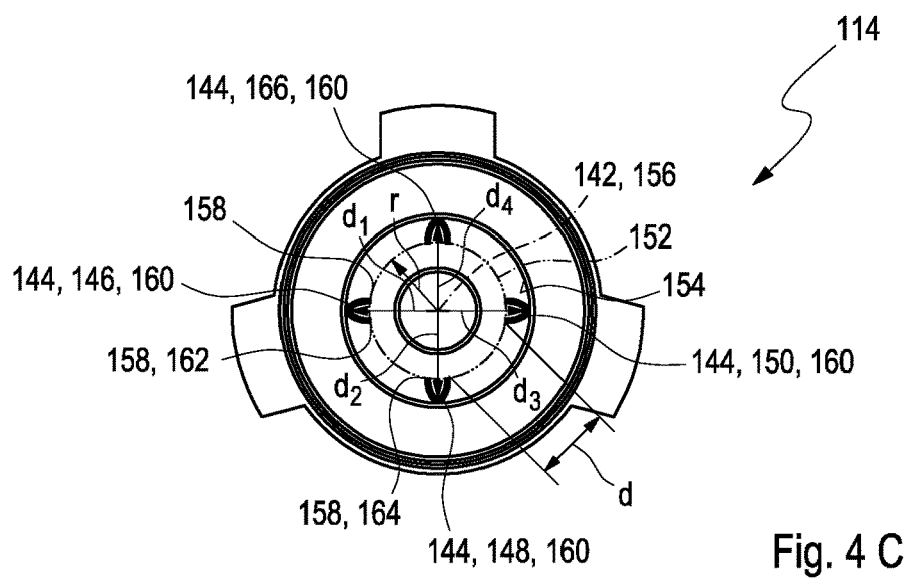
Figure 4:
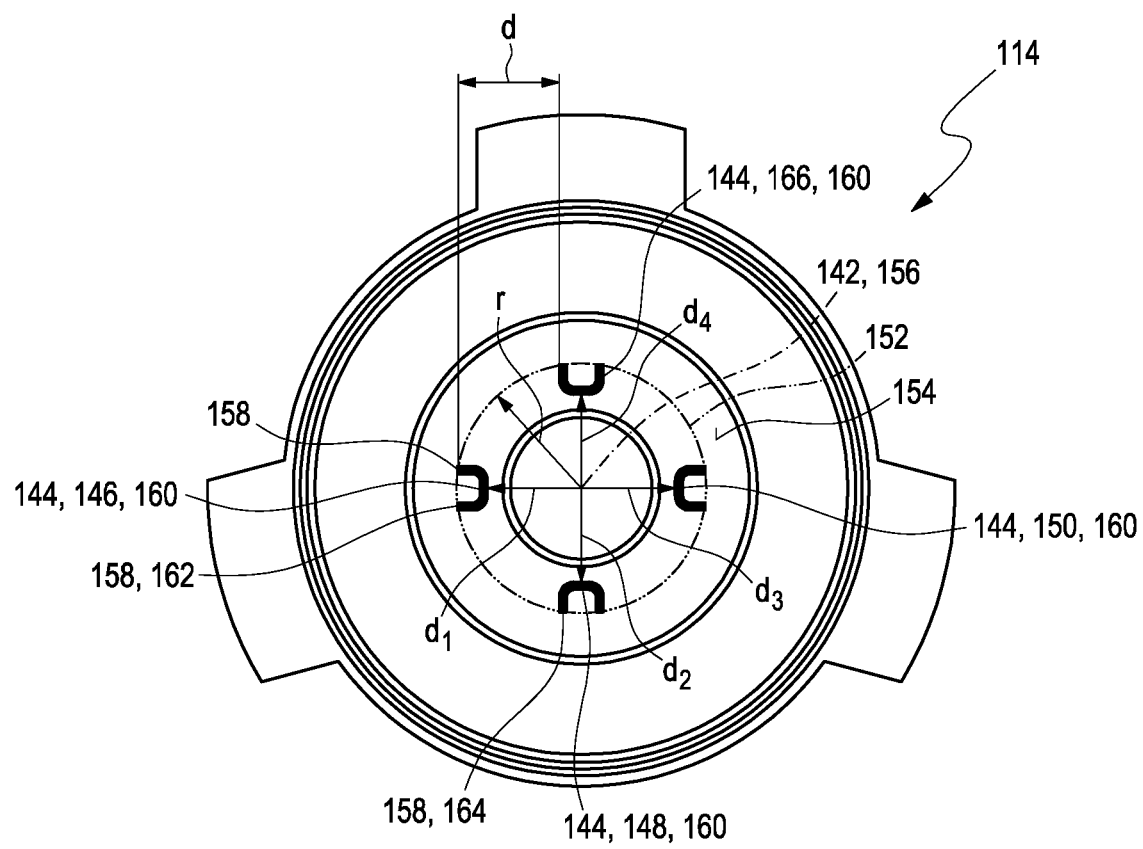

The channels 144 of the rotor according to FIG. 4A may respectively correspond to a circle section 160 and may have a volume of 10 nl. However, other volumes may be feasible as well. Thus, the channels 144 of the rotor 114 according to FIG. 4A may also have a volume of 20 nl or 40 nl. The channels 144 of the rotor 114 according to FIG. 4A may have a length a of 0.95 mm. The channels 144 of the rotor according to FIG. 4B may respectively have a semi-oval shape and may have a volume of 40 nl. The channels 144 of the rotor according to FIG. 4C may respectively have a semicircular shape and may have a volume of 20 nl. However, other volumes may be feasible as well. Thus, the channels 144 of the rotor 114 according to FIG. 4C may also have a volume of 10 nl or 40 nl. The channels 144 of the rotor according to FIG. 4D may respectively have a U-shape and may have a volume of 20 nl. However, other volumes may be feasible as well. Thus, the channels 144 of the rotor 114 according to FIG. 4D may also have a volume of 10 nl or 40 nl. In the rotor according to FIG. 4D, the first channel 146 may comprise the first channel end 162 and the second channel 148 may comprise the second channel end 164. The first channel end 162 and the second channel end 164 may face may each other. The distance d may be greater than 1.0 mm. Specifically, the distance d may be 3 mm.

The rotors 114 according to FIGS. 4A to 4D may show a mirror symmetry with regard to an axis perpendicular to the axis 142 of rotation of the rotor 114. Neighboring channels 144 may be equidistant from each other. The channels each 114 may be shaped equivalently.

Figure 5:
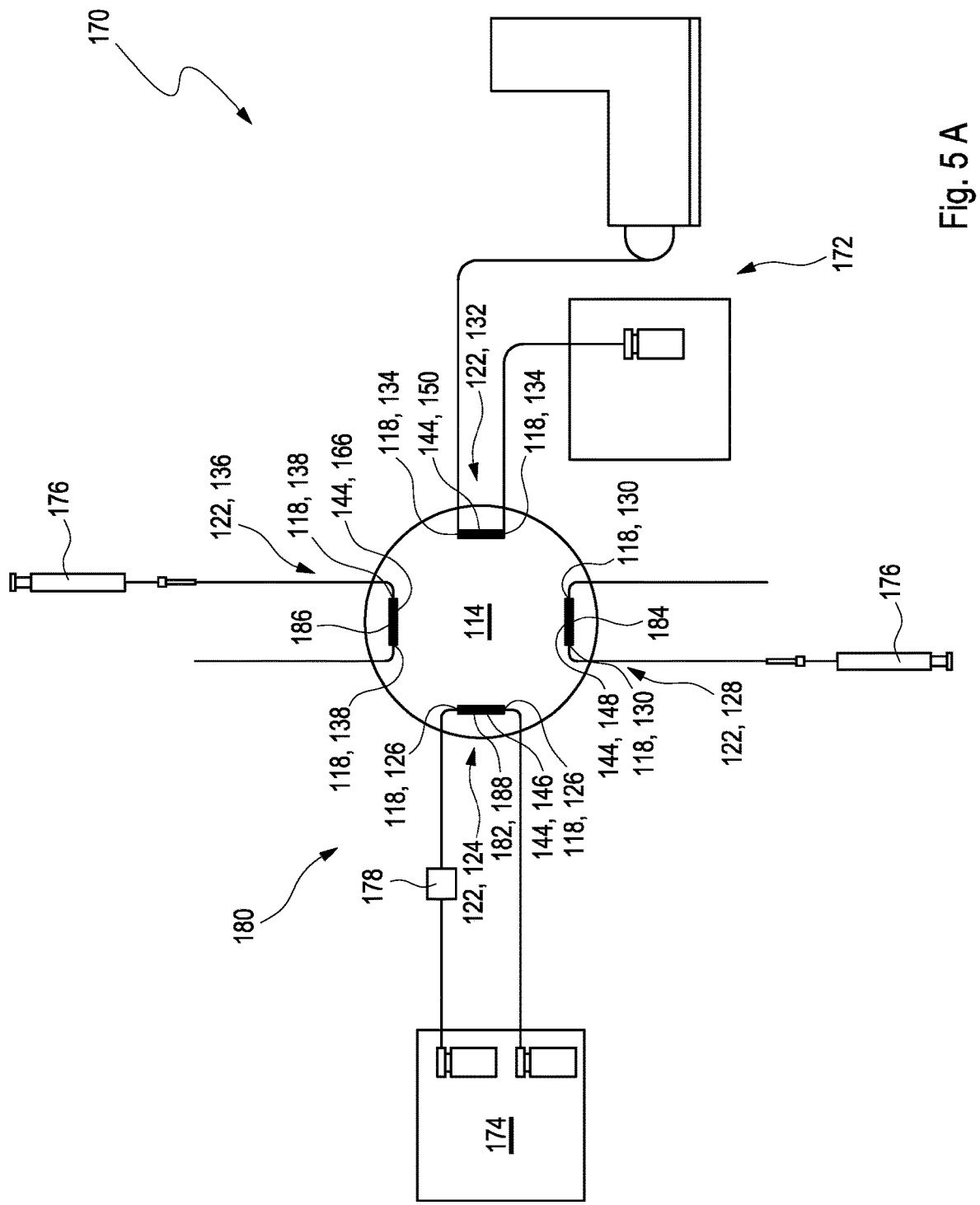
FIGS. 5A to 5B show an exemplary embodiment of an analytical system according to this disclosure in schematic views and in two different orientations.
Figure 5:
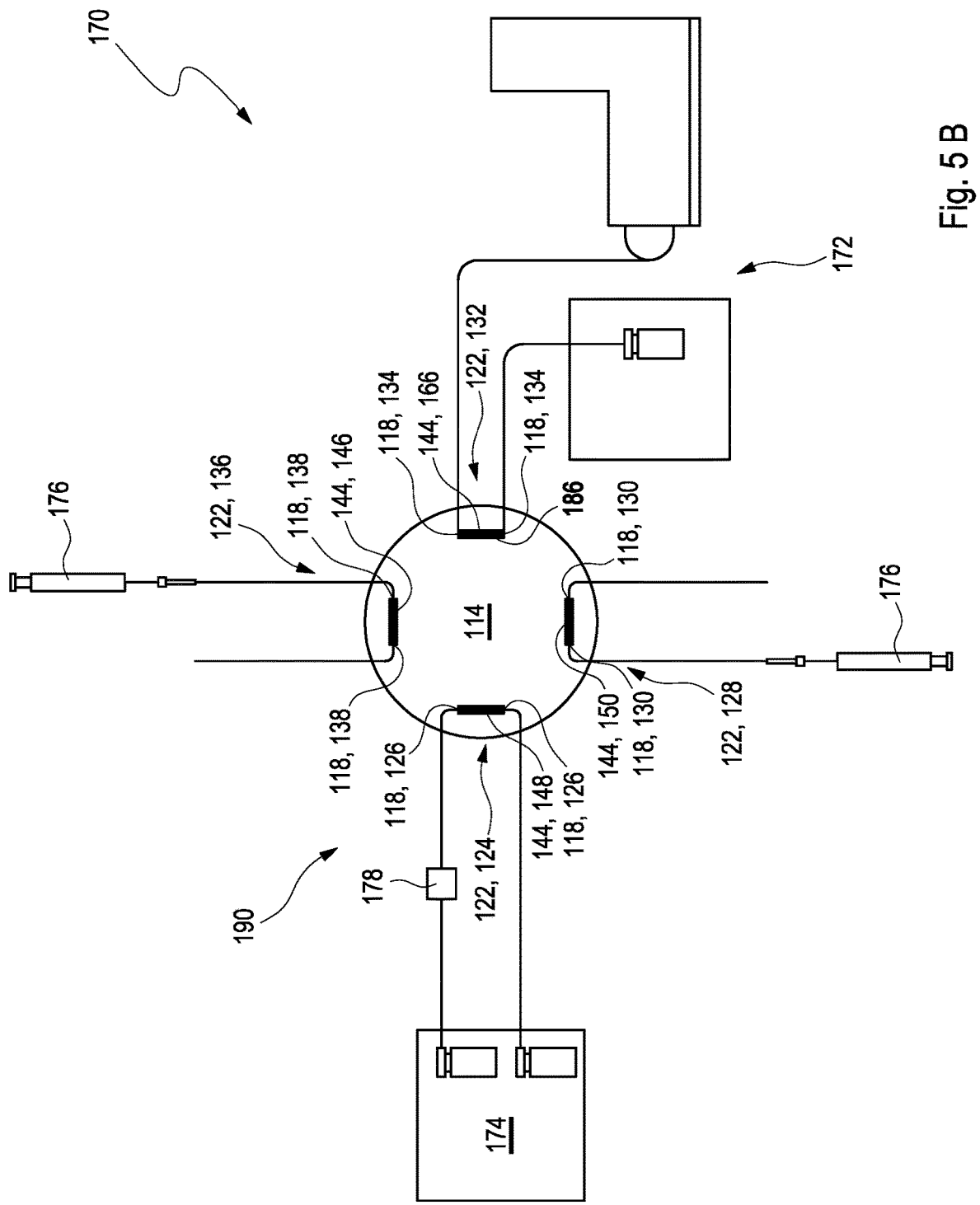

FIGS. 5A and 5B show an exemplary embodiment of an analytical system 170 according to this disclosure in schematic views and in two different orientations. A rotor 114 is depicted schematically which corresponds at least to a large extent to the rotor 114 according to FIG. 4A. Thus, reference is made to the description of FIG. 4A above. Further, ports 118 of the stator 112 are schematically illustrated, although the stator 112 itself is not depicted. The rotor 114 comprises the first channel 146 and the second channel 148. Further, the rotor may comprise the third channel 150 and the fourth channel 166.

The analytical system 170 comprises at least one analytical device 172. The analytical device 172 may exemplarily be or may comprise a mass spectrometer such as a ESI-QTOF-MS. Further, the analytical device 172 may comprise at least one sample separation device 174 such as an electromigrative device. Further, the analytical system 170 may comprise two syringe pumps 176 or any other liquid delivering system. Moreover, the analytical system 170 may have a characterization unit 178 such as an UV detector which is located between the sample separation device 174 and one of the ports 118. The characterization unit 178 may be configured for characterization of at least one property of a fluid such as a velocity of a fluid flow.

In FIG. 5A, the rotor 114 is depicted in a loading orientation 180. In the loading orientation 180, a first fluid 182, specifically a sample 188 is transferable via at least one of the first ports 126 into the first channel 146. Further, a second fluid 184, such as MeOH, is transferable via at least one of the second ports 130 into the second channel 148. Further, a fourth fluid 186, such as a CTAB-solution, is transferable via at least one of the fourth ports 138 into the fourth channel 166.

In FIG. 5B, the rotor 114 is depicted in an injection orientation 190. In the injection orientation 190 as illustrated in FIG. 4B, the fourth channel 166 is connected to the third ports 134 and the fourth fluid 186 is transferable from the fourth channel 166 into one of the third ports 134. The first fluid 182 and the second fluid 184 are already injected into one of the third ports 134.

Figure 6:
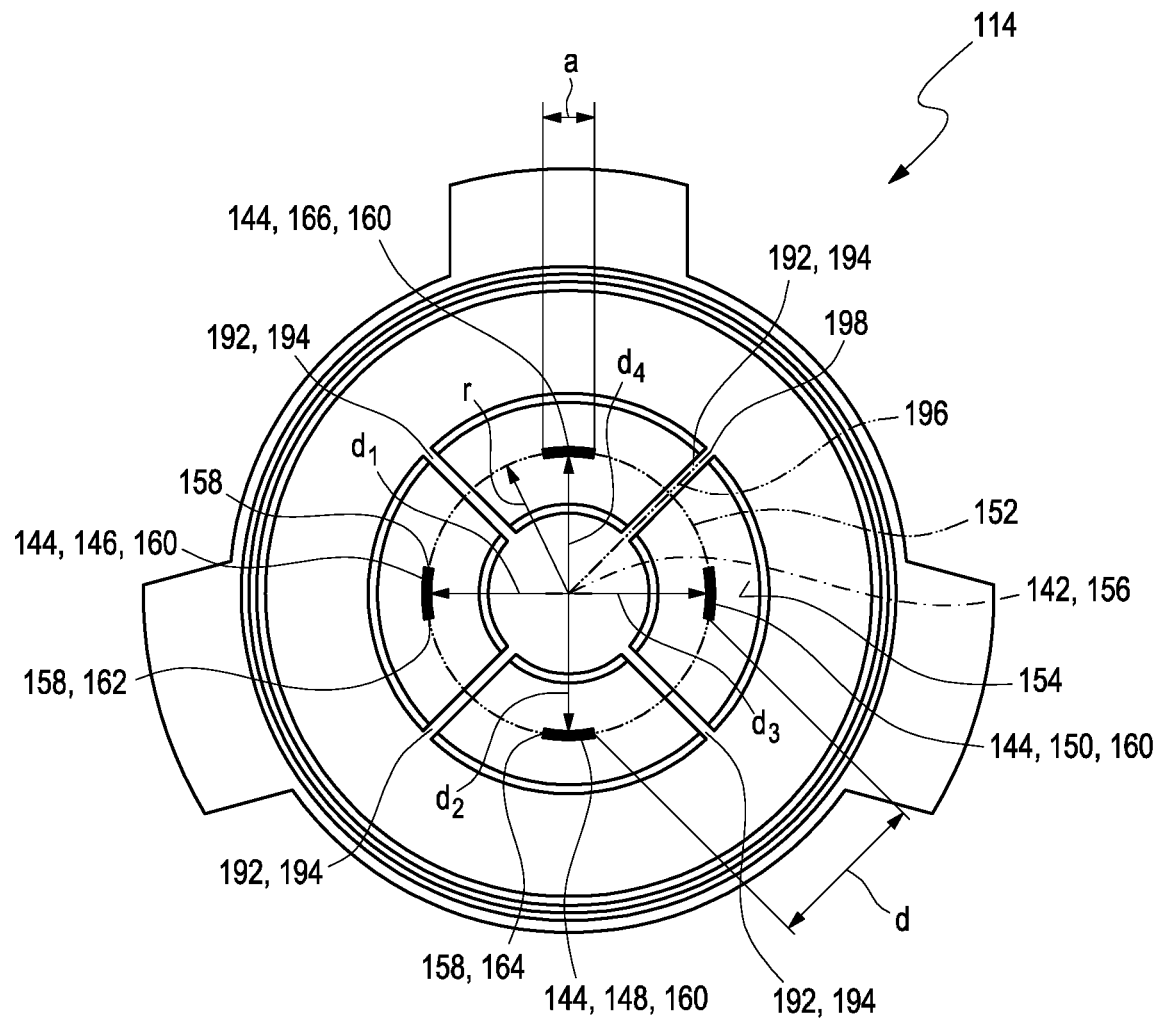
FIGS. 6A and 6B show further exemplary embodiments of a rotor of a valve according to this disclosure.
Figure 6:
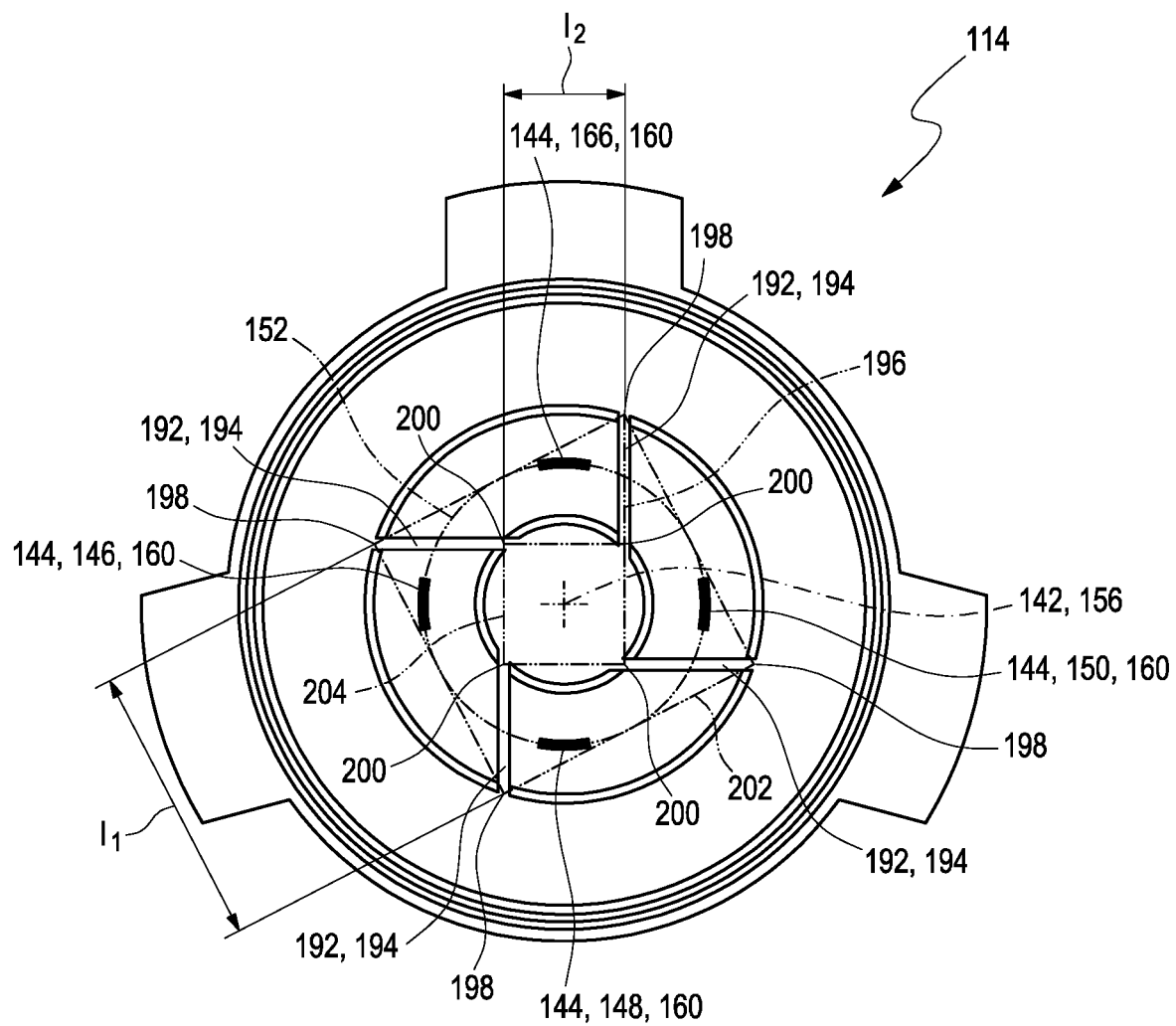

The FIGS. 6A and 6B show further exemplary embodiments of the rotor 114 of the valve 110 according to this disclosure. The rotors 114 may correspond at least partially to the rotor 114 according to FIG. 4A. Thus, reference may be made to the description of FIG. 4A above. The additional groove(s) may serve as additional drainage of liquid film which may spread between rotor and stator. In this way current breakthrough between non-connected liquid channels can be prevented.

In contrast to the rotor 114 according to FIG. 4A the rotor 114 according to FIGS. 6A and 6B further comprises at least one cavity 192 configured to receive excessive fluid. Specifically, the cavity 192 may be embodied as slit 194. Thus, the cavity 192 may have dimensions in the sub-millimeter range and may thus be micro-fabricated. The rotor 114 according to FIGS. 6A and 6B may have four channels 144. Thus, the rotor 144 according to FIGS. 6A and 6B may have four of the cavities 192. The cavities 192 and the channels 144 may be arranged in an alternating matter. Thus, one of the cavities 192 may be arranged between two neighboring channels 144. The cavities 192 of the rotor 114 according to FIG. 6A each may extend along a virtual line 196 extending between the center point 156 of the virtual circle 152 and a point 198 of the virtual circle 152. Thus, the cavities 192 of the rotor 114 according to FIG. 6A each may extend radially with respect to the center point 156 of the virtual circle 152. The cavities 192 the rotor 114 according to FIG. 6B may extend traverse to the virtual line 196. Specifically, the cavities 192 each may comprise one outer end 198 and one inner end 200. The outer ends 198 of the cavities 192 may be located on an outer virtual square 202 and the inner ends 200 of the cavities 192 may be located on an inner virtual square 204. The outer virtual square 202 and the inner virtual square 204 may have the center point 156 of the virtual circle 152 as center point as well. The outer virtual square 202 may have a length $l_1$ and the inner virtual square 204 may have a length $l_2$. The length $l_1$ may be longer than the length $l_2$. The outer virtual square 202 and the inner virtual square 204 may be twisted against each other.

Figure 7:
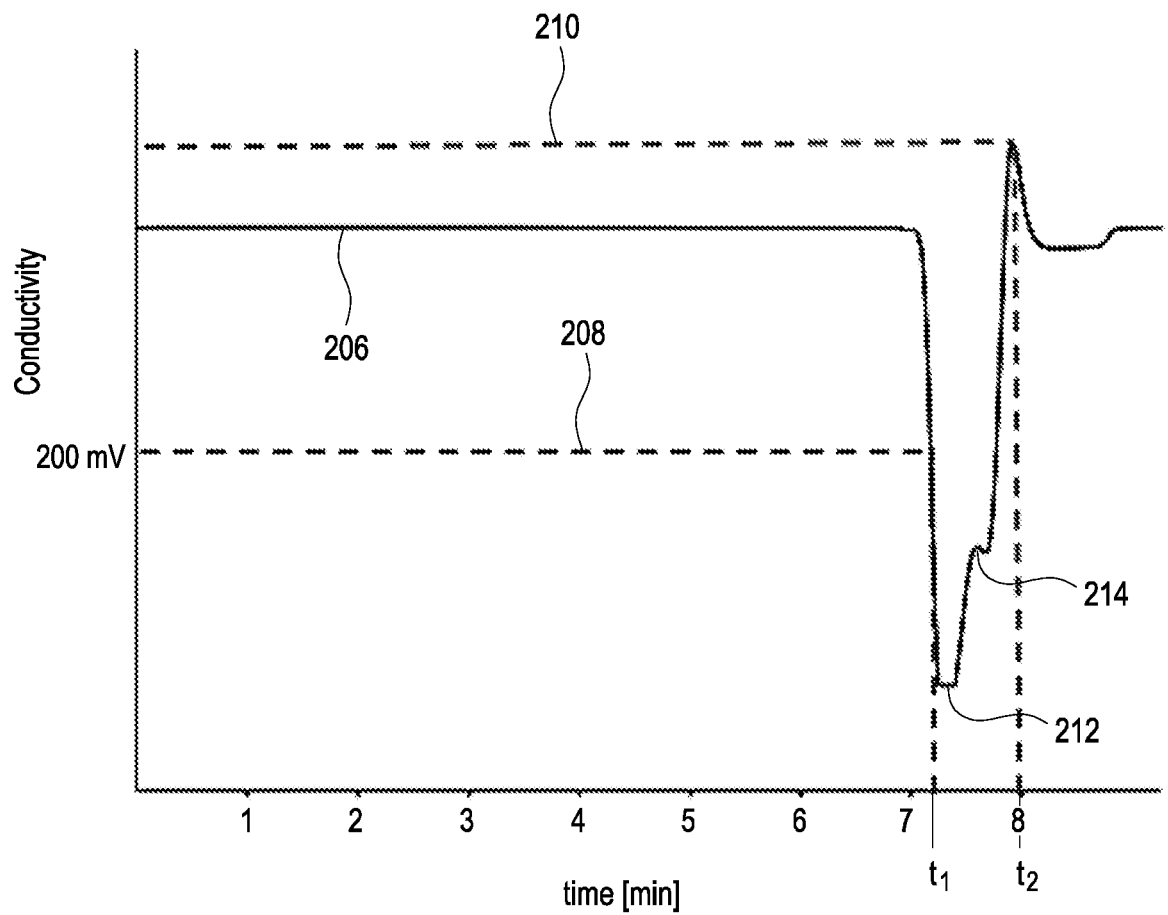
FIG. 7 shows a comparative example of a $C_4$ detector signal of the positioned plugs obtained in a two dimensional separation process.

FIG. 7 shows a comparative example of a $C_4$ detector signal of the positioned plugs obtained in a two dimensional detection process. The setup for obtaining this signal uses a conventional valve having less than the number of ports and channels as described above. The sample was transferred to the analytical device (a CZE-QTOF-MS) by using the sample loop of the valve as injector, i.e., no separation over the sample separation device (a CE(SDS)-UV). To understand the requirements of the two dimensional system, different volumes of methanol and cationic surfactants and their position in respect to the sample were tested. $C_4D$ as intermediate detection (TraceDec® from Innovative Sensor Technologies, Strasshof, Austria) located 4 cm in front of the valve allows determining the precise time for the zones to be in the desired position. A decrease in the conductivity was registered as a negative peak corresponding to the zones of methanol and methanol:water (solvent for the cationic surfactant) passing through the $C_4D$ sensor. Therefore, the $C_4D$ detection can be used for methanol and CTAB positioning at the same time that the separation in the sample separation device takes place. Thus, the transferred peak does not wait in the sample loop for a long time and the analysis time for a complete two dimensional run is reduced. Optimal conditions were 50 mbar for 12 s methanol plus 50 mbar for 20 s 0.4% (v/v) CTAB as the most flexible and efficient conditions. In this way, sufficient methanol before and CTAB after the sample are assured considering the small short-cut of the valve in the two dimensional (approx. volume of one third of the sample loop, ~6.7 nl).

In FIG. 7, the x-axis indicates the time and the y-axis indicates the respective signal obtained. Particularly, the curve 206 indicates the signal obtained, the line 208 indicates the conductivity σ at 200 mV and the line 210 indicates the maximum conductivity σmax. The comparative example of $C_4$ detector signal 206 was obtained in the two dimensional separation process during the positioning of methanol (50 mbar for 10 s, corresponding to peak 212 and cationic surfactant (0.4% (w/v) CTAB in methanol:water (50:50, v/v), 50 mbar for 20 s, corresponding to peak 214 for the SDS-removal strategy. The stop time for the right plug positioning has been calculated by means of an Excel sheet. There, the time $t_1$ of methanol at σ=200 mV, corresponds to the right plug position, and the time $t_2$ at the maximum conductivity of the CTAB plug, which corresponds to the end of the plug, needs to be stated for the calculation of the migration velocity.

Additional, the migration time of the plugs needs to be between 6 to 9 minutes and the total peak around 1 min broad (for a capillary length of around 2×35 cm). This guarantees that the plugs are narrow enough for an exact positioning. If the plugs are later than 10 minutes, a peak broadening can be observed and the positioning is not exact enough. The longer migration time is related to a higher back pressure in the capillary and/or in the valve. The system needs to be flushed with high pressure for several minutes.

Another important indication, if the plugs are narrow enough and the injection volume are correct is the shape of the conductivity signal. The conductivity signal needs to go down to 0 for the methanol plug peak 212 and the CTAB plug should be a clear shoulder of the methanol peak 214. Both needs to be assured for a correct plug positioning.

In the new valve design the $C_4$ detector is not required anymore, however, it may serve as control of the injection process.

While exemplary embodiments have been disclosed hereinabove, the present invention is not limited to the disclosed embodiments. Instead, this application is intended to cover any variations, uses, or adaptations of this disclosure using its general principles. Further, this application is intended to cover such departures from the present disclosure as come within known or customary practice in the art to which this invention pertains and which fall within the limits of the appended claims.

LIST OF REFERENCE NUMBERS

110 Valve
112 Stator
114 Rotor

116 Actuator
118 Port
120 Screw
122 Group
124 First group
126 First port
128 Second group
130 Second port
132 Third group
134 Third port
136 Fourth group
138 Fourth port
140 Leak hole
142 Axis
144 Channel
146 First channel
148 Second channel
150 Third channel
152 Virtual circle
154 Surface
156 Center point
158 End
160 Circle section
162 First channel end
164 Second channel end
166 Fourth channel
168 Axis
170 Analytical system
172 Analytical device
174 Sample separation device
176 Syringe pump
178 Characterization unit
180 Loading orientation
182 First fluid
184 Second fluid
186 Fourth fluid
188 Sample
190 Injection orientation
192 Cavity
194 Slit
196 virtual line
198 outer end
200 inner end
202 outer virtual square
204 inner virtual square
206 signal
208 conductivity at 200 mV
210 maximum conductivity
212 peak
214 peak

What is claimed is:

1. A valve for transferring at least one fluid, comprising:
a stator comprising a plurality of ports arranged in groups, a first of the groups having at least two first ports, a second of the groups having at least two second ports, and a third of the groups having at least two third ports;
a rotor having a first channel having two ends and a second channel having two ends; and
an actuator operably connectable to the rotor and configured to rotate the rotor into a loading orientation in which one or both of the following situations are present:
a) the first channel is connected to the first ports with one of the first ports being fluidically connected at one of the two ends of the first channel and another of the first ports being fluidically connected at the other of the two ends of the first channel, whereby a first fluid is transferable via at least one of the first ports into the first channel;
b) the second channel is connected to the second ports with one of the second ports being fluidically connected at one of the two ends of the second channel and another of the second ports being fluidically connected at the other of the two ends of the second channel, whereby a second fluid is transferable via at least one of the second ports into the second channel;
wherein the actuator is further configured to rotate the rotor into a first injection orientation and a second injection orientation, wherein in the first injection orientation the first channel is connected to the third ports and the first fluid is transferable from the first channel into at least one of the third ports, wherein in the second injection orientation the second channel is connected to the third ports and the second fluid is transferable from the second channel into at least one of the third ports;
wherein the channels are elongate channels which are only partially located on a virtual circle, a center point of which corresponds to an axis of rotation of the rotor, wherein the two ends of each channel are located on the virtual circle with each channel being configured to transfer the at least one fluid from one of the two ends to the other of the two ends and each of the channels define a shape between the two ends of the channel wherein the shape is selected from the group consisting of a semicircular shape, a semi-oval shape and a U-shape.

2. The valve according to claim 1, wherein the first and second channels are each configured such that when the first and second channels are connected to a respective one of the groups of ports, the first and second channels form first and second loops, respectively, wherein fluid is transferable between at least one of the ports of the respective group of ports and the respective channel.

3. The valve according to claim 1, wherein the plurality of ports further comprises a fourth group having at least two fourth ports and wherein the channels further comprise an additional channel, wherein in the loading orientation, the following situation is present:
the additional channel is connected to the fourth ports such that a fourth fluid is transferable into the additional channel; and
the actuator is further configured to rotate the rotor into at least one third injection orientation, wherein in the third injection orientation the fourth fluid is transferable from the additional channel into at least one of the third ports.

4. The valve according to claim 1, wherein at least one of the channels has a volume of 1 nl to 500 nl.

5. The valve according to claim 1, wherein one or more of the channels have a length of 0.5 mm to 5 mm.

6. The valve according to claim 1, wherein the first and second channels comprise first channel and second channel ends, respectively, wherein the first channel end and the second channel end face each other and a distance d between the first channel end and the second channel end is at least 1 mm.

7. The valve according to claim 1, wherein the rotor has a thickness of at least 1.5 mm.

8. The valve according to claim 1, wherein the first and second channels have first and second distances d1 and d2, respectively, to an axis of rotation of the rotor, wherein d1 and d2 are essentially equal.

9. An analytical system for analyzing a sample, comprising:

a valve according to claim 1; and
an analytical device fluidly connectable to the two third ports.

10. The analytical system according to claim 9, further comprising:
a sample separator fluidly connectable to the first ports;
a characterization unit located between the sample separator and the first ports, the characterization unit being configured for characterization of at least one property of the first fluid.

11. A method for transferring at least one fluid, comprising:
providing a valve according to claim 1;
with the rotor in the loading orientation, conducting one or both of (i) feeding the first fluid into the first channel while the first channel is connected to the first ports and (ii) feeding the second fluid into the second channel while the second channel is connected to the second ports;
rotating the rotor into the first injection position to thereby transfer the first fluid to one of the third ports; and
rotating the rotor into the second injection position to thereby transfer the second fluid to one of the third ports.

12. The method according to claim 11, wherein the ports further comprise at least two fourth ports and the channels further comprise an additional channel, wherein the method further comprises the following steps:

feeding a fourth fluid into the additional channel with the rotor in the loading orientation and the additional channel connected to the fourth ports;
transferring the fourth fluid to one of the third ports by rotating the rotor into a third injection orientation from the second injection orientation.

13. A method of using the valve of claim 1, for a purpose selected from the group consisting of: mass spectroscopy detection of protein analysis and proteomics like protein charge variants or of proteoforms and of metabolite analysis and metabolomics; connection of electro driven separation techniques and chromatographic separation to a mass spectrometer.

14. The valve according to claim 1, wherein the rotor defines a plurality of linear cavities configured to receive excessive fluid, wherein the plurality of cavities are arranged in an alternating manner with the first channel and the second channel; and
wherein each of the plurality of linear cavities has an outer end located on an outer virtual square and an inner end located on an inner virtual square wherein the outer virtual square and the inner virtual square both have a common center point that coincides with the center point of the virtual circle with the inner virtual square and the outer virtual square having different rotational orientations relative to the common center point.

* * * * *